United States Patent [19]

Oizumi et al.

[11] Patent Number: 5,770,848
[45] Date of Patent: Jun. 23, 1998

[54] APPARATUS AND METHOD FOR TREATING A COMMODITY BY AUTOMATICALLY RECOGNIZING A BARCODE ATTACHED TO A CONVEYED COMMODITY BY SCANNER

[75] Inventors: Junichi Oizumi; Ryoko Sato; Ikuo Takeuchi, all of Ibaraki-ken; Kousuke Noda, Tsuchiura; Yutaka Nagasawa, Chiba-ken; Noriaki Hagiwara, Owariasahi; Mitsunari Kano, Seto; Shunichi Oohara, Ibaraki-ken; Masao Okayama, Ryugasaki; Yukio Akimoto, Hadano, all of Japan

[73] Assignee: Hitachi, Ltd., Tokyo, Japan

[21] Appl. No.: 563,330

[22] Filed: Nov. 28, 1995

[30] Foreign Application Priority Data

| Nov. 28, 1994 | [JP] | Japan | 6-292566 |
| Dec. 22, 1994 | [JP] | Japan | 6-319863 |
| Feb. 9, 1995 | [JP] | Japan | 7-021676 |

[51] Int. Cl.$^6$ ............................................. B06K 7/10
[52] U.S. Cl. .................................. 235/462; 235/383
[58] Field of Search .................................. 235/454, 462, 235/472, 383; 186/61, 66, 55

[56] References Cited

U.S. PATENT DOCUMENTS

| 4,676,343 | 6/1987 | Humble et al. | 186/61 |
| 4,920,255 | 4/1990 | Gabeler | 235/454 |
| 5,167,301 | 12/1992 | Cappi et al. | 186/66 |
| 5,168,961 | 12/1992 | Schneider | 186/52 |
| 5,525,788 | 6/1996 | Bridgelall et al. | 235/462 |

FOREIGN PATENT DOCUMENTS

| 0 663 643 A2 | 7/1995 | European Pat. Off. |
| 61-128381 | 6/1986 | Japan |
| 3-230286 | 10/1991 | Japan |
| 3-268095 | 11/1991 | Japan |
| 4-105184 | 4/1992 | Japan |
| 4-170689 | 6/1992 | Japan |
| 4-233679 | 8/1992 | Japan |
| 5-67227 | 3/1993 | Japan |
| 7-141533 | 6/1995 | Japan |

*Primary Examiner*—Donald T. Hajec
*Assistant Examiner*—Karl Frech
*Attorney, Agent, or Firm*—Antonelli, Terry, Stout & Kraus, LLP

[57] ABSTRACT

An automatic code recognizing apparatus includes an arithmetic operation unit for calculating the distance from a barcode scanner to the upper surface center of an article to be detected and the distances from barcode scanners to the side surface centers of the article to be detected based on detection signals from a height sensor and a TV camera. A mirror is controlled to focus the focal positions of the barcode scanners on the upper surface center and side surface centers of the article based on the result of calculation of the arithmetic operation unit. With this arrangement, there can be provided the automatic barcode recognizing apparatus capable of recognizing a barcode with a pinpoint accuracy and excellent responsiveness.

25 Claims, 25 Drawing Sheets

DIRECTION OF CONVEYANCE

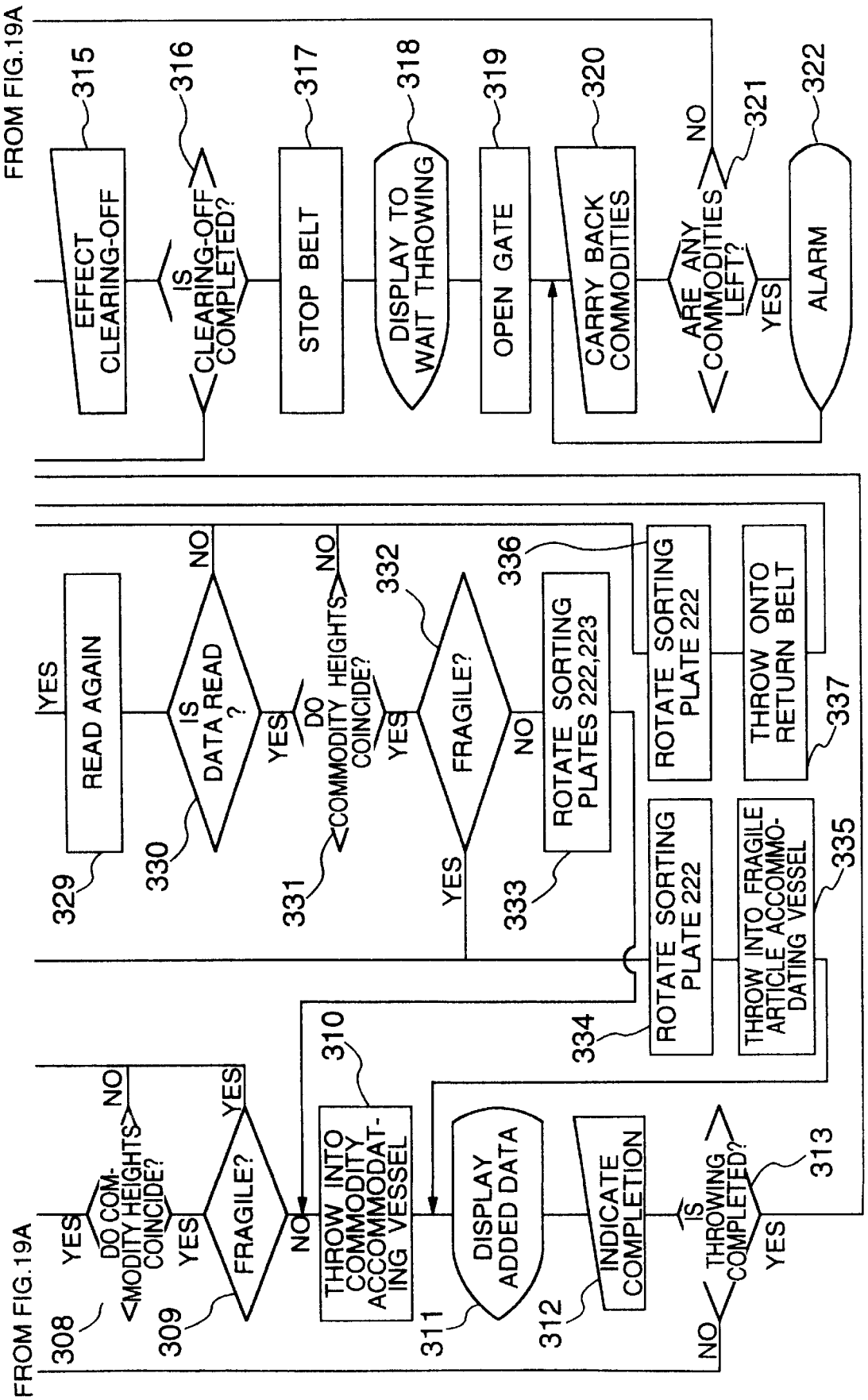

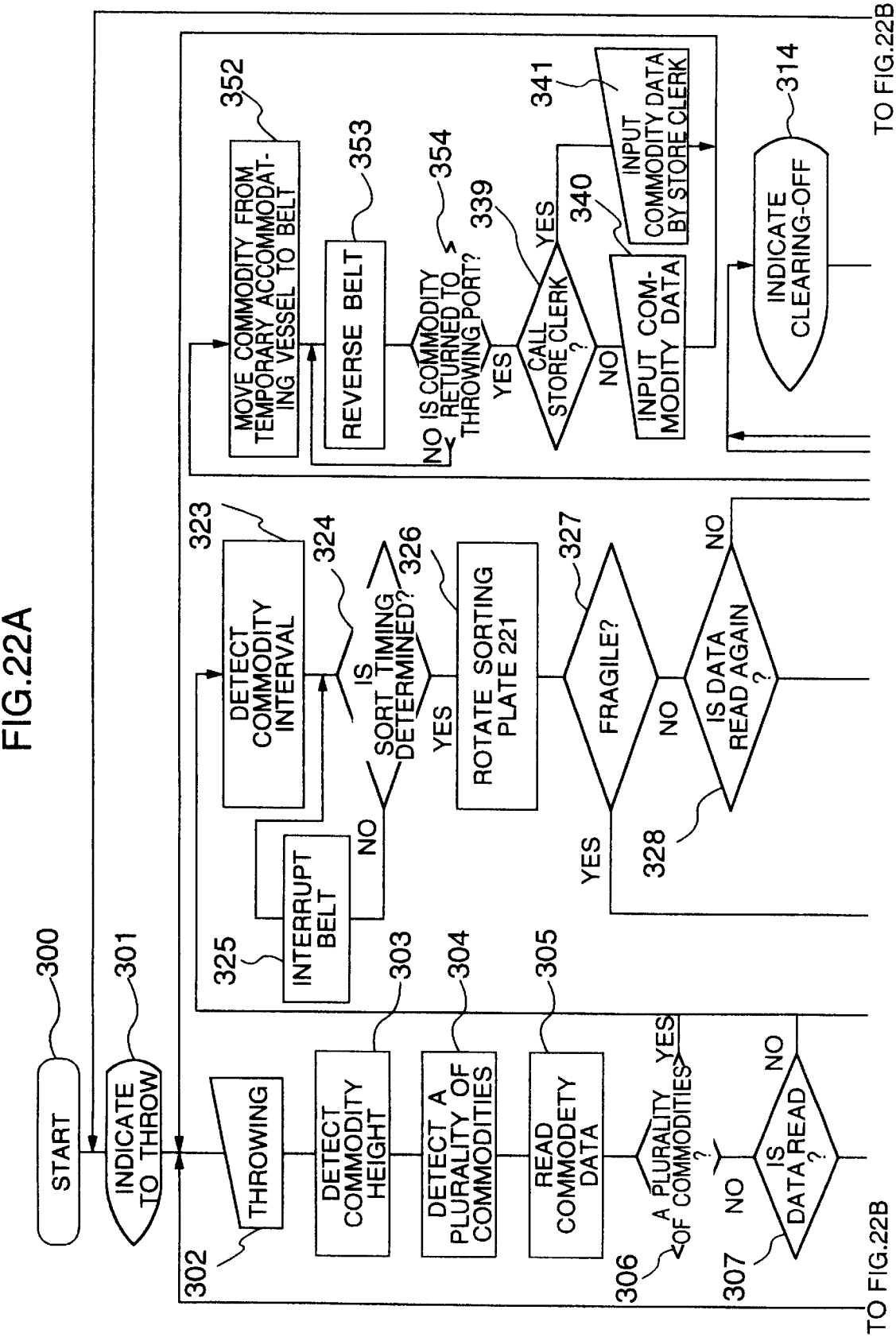

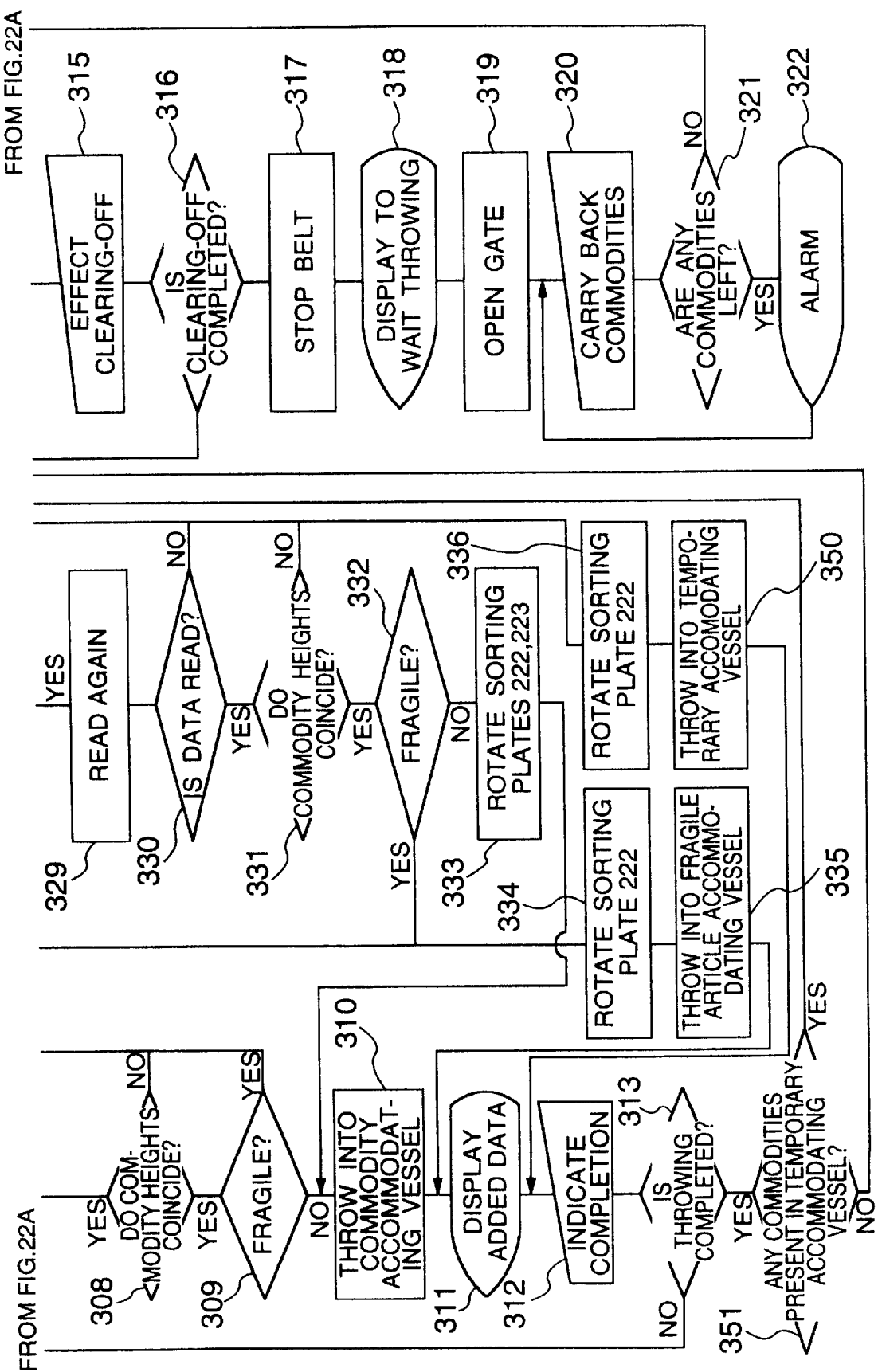

APPARATUS AND METHOD FOR TREATING A COMMODITY BY AUTOMATICALLY RECOGNIZING A BARCODE ATTACHED TO A CONVEYED COMMODITY BY SCANNER

BACKGROUND OF THE INVENTION

1. Field of the Invention

The present invention relates to an automatic barcode recognizing apparatus which is used in a self-service type check-out system employed in volume-sales type stores and used in a management system for postal matters, home delivery services, automatic warehouses, and parts and products in factories.

The present invention also relates to a commodity recognizing apparatus for conveying commodities thrown by a user on a conveying passage and recognizing the commodities by reading the commodity code symbols thereof by a scanner while they are conveyed, and more specifically, to a commodity recognizing apparatus and the recognizing method of the apparatus capable of recognizing a plurality of commodities which are present in the reading area of the scanner at the same time.

2. Description of the Related Art

A commodity purchased by a customer in a volume-sales type store is cleared off in such a manner that a store clerk causes a scanner to read the commodity data code (hereinafter, referred to as a barcode) attached to the commodity and a POS system executes such jobs as the calculation of the thus read data, the issue of a receipt and the like. In this case, the store clerk must confirm the position of the barcode and move the commodity so that it can be read by the scanner.

Further, Japanese Patent Unexamined Publication No. 4-170689 discloses a "POS scanner system" having an object to realize effective reading without the need for a person to confirm a barcode position. The system includes a cylindrical scanner having a barcode reader which turns along the inner surface of the cylinder of the scanner in a direction perpendicular to the center axis of the cylinder and a belt conveyor composed of a transparent material for moving articles in the center axis direction of the scanner. According to this system, a reading efficiency can be improved even if a barcode position is not confirmed.

As shown in Japanese Patent Publication No. 5-40965 (Japanese Patent Unexamined Publication No. 61-128381) or Japanese Patent Unexamined Publication No. 3-268095, there is a conveying system arranged such that a purchaser causes the aforesaid barcode of a commodity to be read and places the commodity on a conveyor, as a check out system by which the purchasers register and clear off the commodities on a self-service basis.

In this conventional system, since the purchaser registers the commodity on the self-service basis, misoperation such as the duplicate registration and unregistration of the commodity caused by the reason that the purchaser does not become accustomed to the system, and unfair operation such as replacement of a purchased commodity with a different commodity and carrying out of an unregistered commodity must be detected and prevented.

Further, as disclosed in Japanese Patent Unexamined Publication No. 4-105184 and Japanese Patent Unexamined Publication No. 4-233679, there is a system which requires a purchaser only to place a commodity on a conveyor to enable the system to read the barcode of the commodity while the commodity is conveyed, as another check out system for registering a commodity on the basis of self-service. In this case, the system checks the commodity and charges the purchaser for the commodity.

However, since the center of the scanner is fixed and no countermeasure is taken with respect to the area outside of the area of the scanner in these automatic barcode recognizing apparatuses, when the barcode of an article to be detected is located outside of the area of the scanner in a wide conveying passage, the barcode cannot be recognized.

Although it is contemplated to increase the number of barcode scanners as shown in Japanese Patent Unexamined Publication No. 7-141553 in order to enlarge an area where a barcode can be detected, mechanisms and elements are made complex in the automatic barcode recognizing apparatus by such an arrangement.

Likewise the apparatus disclosed in Japanese Patent Unexamined Publication No. 1-244586, a conventional commodity recognizing apparatus used to recognize a purchased commodity thrown by a customer is arranged such that each of the commodities thrown by the customer one by one is conveyed on a conveying passage while controlling the conveying passage so that only one commodity is present in the commodity recognizing area on the conveying passage and the commodity thrown by the customer is recognized by a scanner which reads the barcode of the commodity.

When the purchased commodity thrown by the customer is to be recognized, the misoperation and unfair operation by the customer must be prevented as well as the operation effected by the customer must be simplified and a speed for recognizing the commodities must be increased. For this purpose, even if a plurality of commodities thrown by the customer are present in the reading area of the scanner, these commodities must be simultaneously recognized. In prior art, however, when a plurality of commodities are present in the recognizing area and a scanner reads a plurality of barcodes, the scanner cannot recognize the corresponding relationship between the read barcodes and the barcodes of the commodities and thus cannot recognize the commodities. Since only one of the commodities can be present in the recognizing area as described above, the customers must throw the commodities one by one according to an instruction from a commodity recognizing apparatus. Under such circumstance, even commodities of the same type and small articles must be also thrown one by one, from which a problem arises in that a commodity throwing motion of a customer is made complex as well as the recognition of a commodity requires a long time.

Although the aforesaid prior arts improve a barcode reading efficiency, there is a possibility that reading may be missed by any reason. Further, there are commodities on which barcodes are not shown. The prior arts do not take a countermeasure to cope with these cases into consideration.

SUMMARY OF THE INVENTION

A first object of the present invention is to provide an automatic barcode recognizing apparatus for reading a barcode attached to an article while the article is being conveyed by a conveyor which is capable of recognizing the barcode with a pinpoint accuracy and excellent responsiveness.

A second object of the present invention is to provide a commodity recognizing apparatus capable of recognizing a plurality of commodities which are present in the reading areas of scanners at the same time, when a customer throws commodities continuously or simultaneously.

A third object of the present invention is to provide an automatic commodity clearing-off method and an apparatus for the method capable of clearing off commodities in a short time without interrupting the processing of the commodities even if there is a commodity from which a barcode (in general, commodity data) cannot be read.

To achieve the above first object, the automatic barcode recognizing apparatus of the present invention which includes conveying means having a conveying passage on which an article to which a barcode is attached is conveyed and barcode scanners for recognizing the barcode of the article being conveyed by being placed on the conveying passage comprises article detecting means for detecting that the article is placed on the conveying passage, height detecting means for detecting the height of the article on the conveying passage, conveying state detecting means for detecting the upper surface center of the article on the conveying passage and the position of the article on the conveying passage in the width direction of the conveying passage, arithmetic operation means for calculating the distance from the barcode scanner to the upper surface center of the article and the distances from the barcode scanners to the side surface centers of the article, based on the result of detection of the height detecting means and the conveying state detecting means, and focal position adjusting means for focusing the focal positions of the barcode scanners on the upper surface center of the article and the side surface centers of the article, based on the result of calculation of the arithmetic operation means.

In the automatic barcode recognizing apparatus of the present invention, it is preferable that the height detecting means has a light emitting unit for emitting planar lights which are perpendicular to the surface of the conveying passage and the planes of which transit the conveying passage and a light receiving unit for receiving the planar lights.

In the automatic barcode recognizing apparatus of the present invention, it is preferable that the height detecting means has a light emitting unit for emitting planar lights which are perpendicular to the surface of the conveying passage and the planes of which transit the conveying passage, a reflecting mirror for reflecting the planar lights having transited the conveying passage and a light receiving unit for receiving lights reflected by the reflecting mirror.

In the automatic barcode recognizing apparatus of the present invention, it is preferable that the conveying state detecting means is any one of a one-dimensional image sensor and a two-dimensional image sensor disposed at a position overlooking the conveying passage.

In the automatic barcode recognizing apparatus of the present invention, it is preferable that the focal position adjusting means has a mirror surface for reflecting a laser beam for detecting a barcode as well as changing the light path direction of the laser beam and focuses the scanning center of the barcode scanner on the upper surface center of the article and the side surface centers of the article by changing the angle of the mirror surface.

In the automatic barcode recognizing apparatus of the present invention, it is preferable that the focal position adjusting means provides a plurality of lenses each having a different focal distance with a laser beam emitting unit for detecting a barcode and adjusting a focal distance by switching the lenses based on the result of detection of the height detecting means and the conveying state detecting means.

When an article is placed on the conveying passage of the conveying means in this automatic barcode recognizing apparatus, it is detected by the article detecting means that the article is placed there and the article moves on the conveying passage. When the article moves to a position where the height detecting means is disposed, the height detecting means detects the height of the article on the conveying passage. Further, when the article moves near to a position where the conveying state detecting means is disposed, the conveying state detecting means detects the upper surface center of the article on the conveying passage and the position of the article on the conveying passage in the width direction thereof.

The arithmetic operation means calculates the distance from the barcode scanner to the upper surface center of the article and the distance from the barcode scanners to the side surface centers of the article based on the result of detection of the height detecting means and the conveying state detecting means. The focal position adjusting means focuses the focal positions of the barcode scanners on the upper surface center of the article and the side surface centers thereof based on the result of calculation of the arithmetic operation means.

It is preferable for the focal position adjusting means to focus the focal positions of the barcode scanners on the upper surface center of the article and the side surface centers thereof calculated by the arithmetic operation means by changing the scanning light paths of a laser beam of the barcode scanners using the mirror surface.

With this arrangement, the barcode recognizing areas of the respective barcode scanners can be enlarged, so that barcodes attached to commodities having various types of complex shapes can be correctly detected as well as the barcodes of commodities in a wide range can be recognized without increasing the number of the barcode scanners.

According to the automatic barcode recognizing apparatus, the provision of the mirror surface for reflecting the laser beam emitted from the barcode scanners to detect barcodes enables a focal position to be adjusted by rotating the mirror surface at a desired angle which is relatively light in weight without the need of moving the heavy barcode scanners, so that the focal position can be adjusted at a high speed to detect barcodes at a high speed.

Further, since the focal position adjusting means adjusts the focal distances of the barcode scanners by switching a plurality of the lenses, the focal distances of the barcode scanners can be adjusted at a high speed.

To achieve the above second object, the commodity recognizing apparatus of the present invention comprises one-dimensional or two-dimensional pattern reading means for reading the patterns of commodities being conveyed disposed upstream of a scanner for reading the barcodes of the commodities on the conveying passage, trigger signal creating means for creating a trigger signal for starting reading operation effected by the pattern reading means, height measuring means for measuring the heights of the commodities, arithmetic operation means for calculating the region where the commodities are present in the reading area of the scanner based on the patterns of the commodities read by the pattern reading means and the heights of the commodities measured by the height measuring means, reading area limiting means for limiting the reading area of the scanner in accordance with the region calculated by the arithmetic operation means where the commodities are present, memory means for storing whether the scanner succeeds in the reading of a barcode or not for each region limited by the reading area limiting means, and register means for registering only the commodities having successfully read barcodes and stored in the memory means, wherein when the commodities thrown by the customer are conveyed on the conveying passage and the trigger signal creating means outputs a trigger signal by detecting the commodities, the pattern reading means reads the patterns of the commodities on the conveying passage, the height measuring means measures the heights of the commodities, the arithmetic operation means calculates the region where the commodities are present in the reading area of the scanner based on the read patterns of the commodities and the measured heights thereof, the reading area limiting means sequentially limits the reading area of the scanner in accordance with the region where the commodities are present, the memory means stores the result of the barcodes read by the scanner for respective regions and the register means registers only the commodities which are present in the regions stored in the memory means where the barcodes are successfully read, whereby a plurality of commodities present in the reading area of the scanner at the same time can be recognized.

In the commodity recognizing apparatus of the present invention, a plurality of commodities present in the reading area of the scanner at the same time are recognized in such a manner that when the trigger signal creating means detects the commodities and outputs a trigger signal for causing the pattern reading means to start reading, the pattern reading means disposed upstream of the scanner on the conveying passage reads the patterns of the commodities being conveyed, the height measuring means measures the heights of the commodities, the arithmetic operation means calculates the region where the commodities are present in the reading area of the scanner based on the patterns read by the pattern reading means and the heights of the commodities measured by the height measuring means, the reading area limiting means sequentially limits the reading area of the scanner in accordance with the region calculated by the arithmetic operation means where the commodities are present, the memory means stores whether the scanner has succeeded in the reading of the barcodes or not for the respective regions limited by the reading area limiting means and the register means registers only the commodities stored in the memory means whose barcodes have been successfully read, so that the commodities thrown by the customer can be correctly recognized at a high speed.

To achieve the above third object, the present invention discloses an automatic commodity clearing-off method which comprises the steps of conveying commodities thrown from a throwing port by a conveying means, respectively, reading the barcodes attached to the commodities by barcode reading means, accommodating the commodities from which the barcodes have been read in a commodity accommodating vessel, adding the prices contained in the commodity data of the barcodes read from the commodities by arithmetic operation means and displaying and clearing off a total amount of money when a customer has completed the throwing of commodities and the prices of the commodities have been added, wherein when the barcode of a commodity can not read by the barcode reading means, the barcode of the commodity is read again by re-reading means provided independently of the reading means and when the barcode can be read by the re-reading, the commodity is accommodated in the commodity accommodating vessel and the price of the commodity is added, whereas when the barcode of the commodity cannot be read even by the re-reading, the commodity is moved to a temporary accommodating vessel.

The present invention discloses an automatic commodity clearing-off method arranged such that a conveying means is a conveying belt, a barcode reading means reads a barcode when the barcode is attached to the surface of a commodity conveyed on the conveyor belt which does not confront the conveyor belt and a re-reading means reads the barcode when the barcode is attached to the surface of the commodity which confronts the conveyor belt.

The present invention discloses an automatic commodity clearing-off method arranged such that height data indicating the height of a commodity is entered into commodity data, the height of the commodity is measured hen a barcode is read by a barcode reading means, and when the difference between the measured height and the height data contained in the read commodity data exceeds a predetermined value, the commodity is moved into a temporary accommodating vessel.

Further, the present invention discloses an automatic commodity clearing-off method arranged such that when a commodity is a fragile commodity, fragile article information indicating that the commodity is fragile is entered into the commodity data pointed by the barcode data and when the fragile article information is contained in the commodity data of the barcode read by a barcode reading means or a re-reading means, the commodity is accommodated in a fragile article accommodating vessel prepared independently of a commodity accommodating vessel.

The barcode reading means cannot often read a barcode when the barcode is attached to the surface of a commodity which is in contact with the conveying means. Thus, a reading success ratio can be greatly improved by the provision of the re-reading means which can read the above-mentioned surface. At the same time, even if there is a commodity from which a barcode cannot be read, since the operation of the apparatus can be continued without being interrupted, a commodity processing speed can be increased and a waiting time for clearing-off commodities can be shortened.

When a commodity has a greatly different height, it is contemplated that a plurality of commodities are vertically piled, and in this case, there is a possibility that the barcode of only a single commodity is read and only the price of the commodity is added. In such a case, the miscount of the price can be prevented by bypassing the commodities to a temporary accommodating vessel.

Further, a fragile commodity can be prevented from being damaged by recognizing the fragility thereof from commodity data and moving the commodity to a fragile article accommodating vessel through a gentle slope without applying shock to the commodity.

BRIEF DESCRIPTION OF THE DRAWINGS

FIGS. 19A and 19B are operation flowcharts of the embodiment of FIG. 16;

FIGS. 22A and 22B are operation flowcharts of the embodiment of FIG. 20;

DESCRIPTION OF PREFERRED EMBODIMENTS

Embodiments of the present invention will be described below with reference to the drawings.

Figure 1:
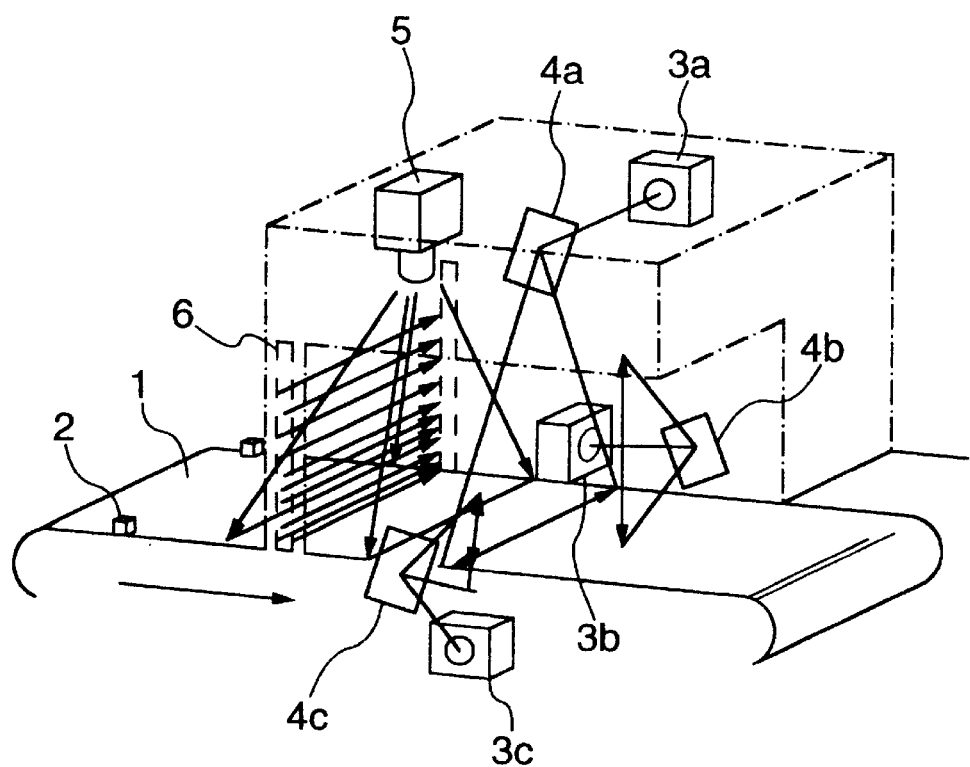
FIG. 1 is a schematic perspective view showing an automatic barcode recognizing apparatus according to an embodiment of the present invention.

FIG. 1 is a schematic perspective view showing an automatic barcode recognizing apparatus according to an embodiment of the present invention. The automatic barcode recognizing apparatus includes a belt conveyor 1 as a conveying means having a conveying passage for conveying articles on which barcodes are attached and three sets of barcode scanners 3a, 3b and 3c for recognizing the barcodes of the articles being conveyed on the belt conveyor 1.

The automatic barcode recognizing apparatus further includes a commodity detecting sensor 2 as an article detecting means for detecting that an article is placed on the belt conveyor 1, a height sensor 6 as a height detecting means for detecting the height of the article on the belt conveyor 1, a TV camera 5 as a conveying state detecting means for detecting the upper surface center of the article on the belt conveyor 1 and the position of the article in the width direction of the belt conveyor where the article is placed on the belt conveyor 1, a calculating means (not shown) for calculating a distance from the barcode scanner 3a to the upper surface center of the article and distances from each of the barcode scanners 3b and 3c to the center positions on both sides of the article based on a result of detection effected by the height sensor 6 and the TV camera 5 and mirrors 4a, 4b and 4c as a focal position adjusting means for focusing the focal position of the barcode scanner on the upper surface center of the article and the center positions on both the sides of the article based on a result of calculation effected by the calculating means.

The automatic barcode recognizing apparatus may be also used as a check out apparatus for enabling a purchaser to register and clear off commodities on a self-service basis. Although not shown, the check out apparatus is composed of accommodating vessels for accommodating commodities whose barcodes were detected by the automatic barcode recognizing apparatus, a display unit for displaying operation guidance and commodity information, a keyboard through which an operator indicates processing, a stopper for prohibiting the traffic of the purchaser, a switching lever for switching the accommodating vessels for accommodating the commodities whose barcodes were detected, a printer for printing receipts, a magnetic card reader/writer, a store clear calling lamp for indicating that a store clerk is called, an operator sensor for detecting the operator, and the like.

Next, operation of the automatic barcode recognizing apparatus used also as the check out apparatus will be described. First, when it is detected by the operator sensor that an operator stands in front of the apparatus, the apparatus is made operable and a method of operating the apparatus is displayed on the display unit. The operator places a commodity on the belt conveyor 1 so that a barcode label faces in an upward or lateral direction.

Then, the commodity detecting sensor 2 disposed at a commodity throwing portion detects the commodity and conveys the belt conveyor 1 toward the accommodating vessel. When the commodity is conveyed to the position of the height sensor 6, the height of the commodity is detected by the height sensor 6.

Figure 2:
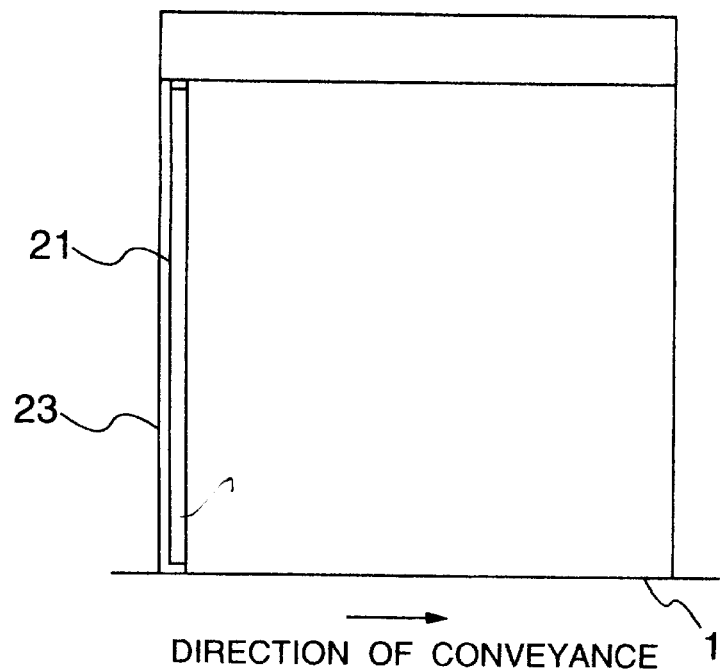
FIG. 2 is a side elevational view showing a height sensor in the automatic barcode recognizing apparatus according to the embodiment of the present invention.
Figure 3:
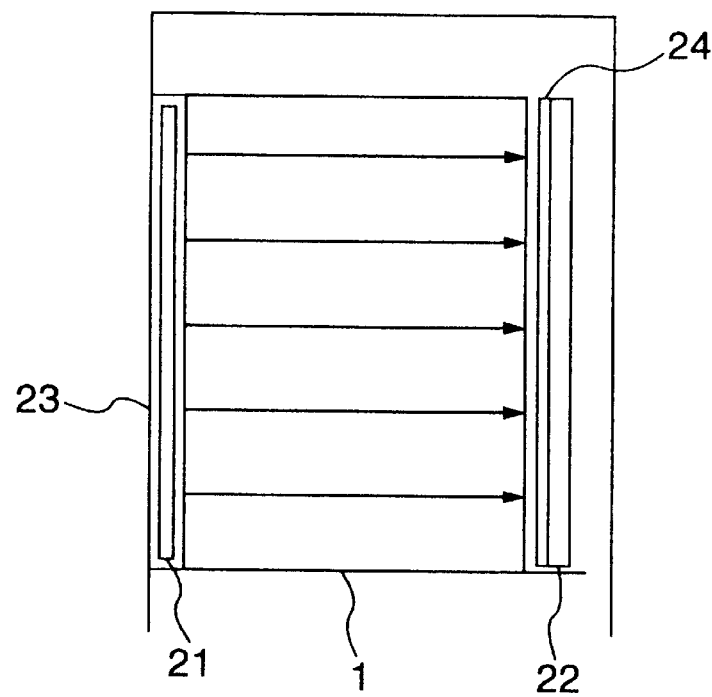
FIG. 3 is a front elevational view of the height sensor shown in FIG. 2.

FIGS. 2 and 3 show an example of the specific arrangement of the height sensor 6. FIG. 2 is a side elevational view of the height sensor 6 in the vicinity of the belt conveyor 1 and FIG. 3 is a front elevational view of the height sensor 6 in the vicinity of the belt conveyor 1. The height sensor 6 shown in these drawings is composed of a light emitting unit 21 composed of a plurality of light emitting elements such as light emitting diodes LED or the like, a light receiving unit 22 composed of a light receiving element such as a phototransistor, a CCD line sensor or the like confronting the light emitting unit across the belt conveyor 1 and a filter 24 disposed forward of the light incident surface of the light receiving unit 22.

In the height sensor 6, the light emitting unit 21 emits planar lights which are perpendicular to the surface of a conveying passage and the planes of the lights transit the conveying passage. The light receiving unit 22 received the planar light emitted by the light emitting unit 21.

Further, the height sensor 6 may be also arranged such that a reflecting mirror (not shown) is disposed to reflect the planar lights emitted by the light emitting unit 21, the light emitting unit 21 is caused to confront the reflecting mirror across the conveying passage of the belt conveyor 1 and a light receiving unit is further disposed to receive lights reflected by the reflecting mirror.

When the commodity moves on the belt conveyor 1 and reaches a position where the commodity blocks the lights emitted from the light emitting unit 21, the height of the commodity can be detected by detecting the height of the blocked lights by the light receiving unit 22.

Note, the filter 24 is used to reduce the influence of disturbance lights in the light receiving unit.

Figure 4:
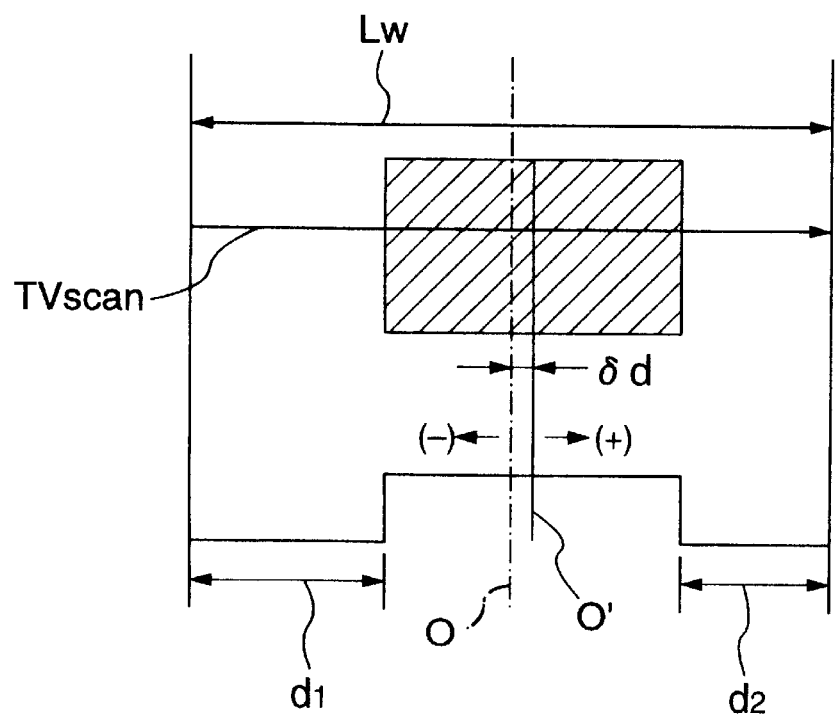
FIG. 4 is a view explanatory of a method of detecting the upper surface center of a commodity in the automatic barcode recognizing apparatus according to the embodiment of the present invention.

On the other hand, the TV camera 5 detects the upper surface center of the commodity and the side positions thereof from an overlooking position of the conveying passage of the belt conveyor 1. FIG. 4 is a view explanatory of a method of detecting the upper surface center of the commodity with respect to the width direction of the conveying passage of the belt conveyor 1, wherein the TV camera 5 overlooks the commodity from the overlooking position of the conveying passage.

When it is assumed here that the conveying passage of the belt conveyor 1 has a width Lw, a left side distance from an end of the width of the conveying passage to the position of an end of the commodity is represented by d1, and a right side distance thereof is represented by d2, a positional dislocation of the center O' of the commodity from the center 0 of the conveying passage is expressed by the following formula (1).

$$\delta d=(d1-d2)/2 \quad (1)$$

Figure 8:
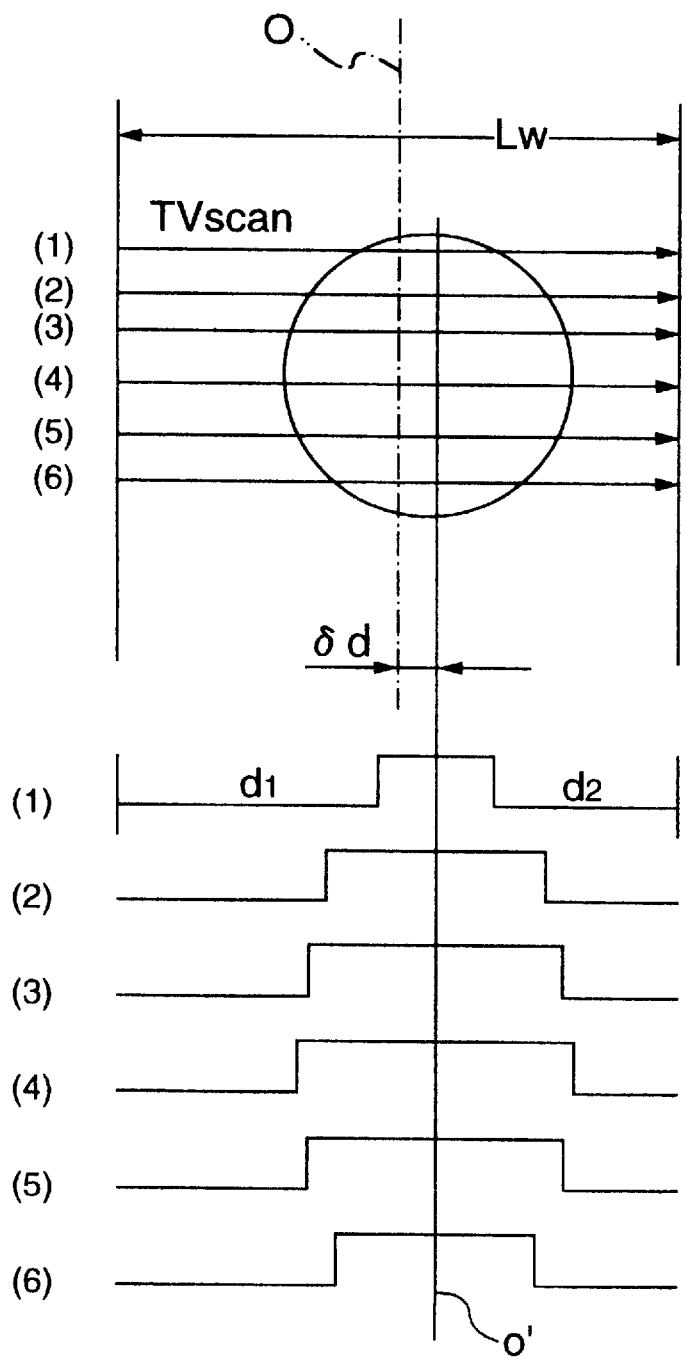
FIG. 8 is a view explanatory of a method of detecting the upper surface center of a circular article in the automatic barcode recognizing apparatus according to the embodiment of the present invention.

Further, FIG. 8 shows a case that the upper surface center of a circular article is detected as an example. As shown in FIG. 4, d1 and d2 are determined for each scanning and the positional dislocation Ed is determined from the formula (1). In the circular article, δd is the same for each scanning.

Figure 9:
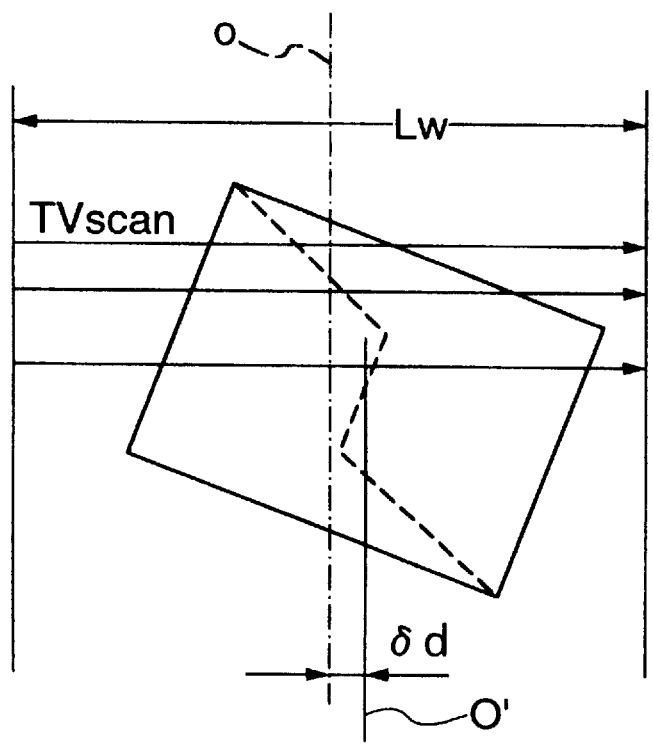
FIG. 9 is a view explanatory of a method of detecting the upper surface center of a rectangular article in the automatic barcode recognizing apparatus according to the embodiment of the present invention.

FIG. 9 shows a case for detecting the upper surface center of a rectangular article when it is placed obliquely with respect to the conveying direction of the belt conveyor 1 as another example. In this case, d1 and d2 are also determined for each scanning and the positional dislocation δd is determined from the formula (1). However, the center positions for respective scannings draw a meandering line as shown by a broken line in FIG. 9.

In this case, an average value of the positional dislocations δd for respective scannings is determined and used as an upper surface center. Further, in the case of various types of commodities having an indefinite shape, an average value of the positional dislocations δd for respective scannings is determined and used as the upper surface center of the commodities.

The TV camera 5 as a two-dimensional sensor can count d1 and d2 using a counter for counting d1 and a counter for counting d2 through binary coding each time, for example, horizontal scanning (main scanning) is carried out and determine the positional dislocation δd of an upper surface center from the difference between d1 and d2 and data for a single screen can be processed in 1/60 second.

When a one-dimensional line sensor is used, although scanning can be carried out at the scanning speed of the line sensor in a horizontal scanning direction, scanning in a vertical scanning direction depends upon the speed of the belt conveyor and thus a processing time needed is a time until an article to be detected passes through the scanning position of the line sensor.

Next, when a commodity reaches the reading areas of the barcode scanners 3a, 3b and 3c, the barcode label attached to the commodity is read by the barcode scanners 3a, 3b and 3c as the commodity moves so that the commodity code is recognized.

A barcode is usually detected by a laser beam in such a manner that the laser beam is reflected by a rotary polygon mirror to linearly scan the barcode and lights reflected from the barcode are detected by being received by a photodiode or a phototransistor.

Figure 10A:
FIGS. 10A, 10B, 10C and 10D are views explanatory of examples of barcode detecting signals.
Figure 10B:
Figure 10C:
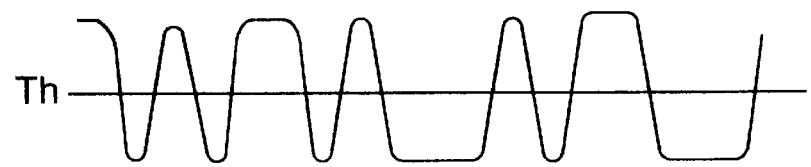
Figure 10D:
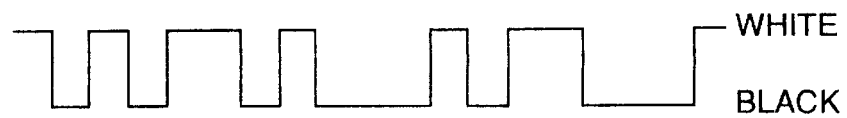

FIGS. 10A to 10D are views explanatory of examples of barcode detecting signals. FIG. 10 is an example of the barcode and a laser beam scans a line P. FIG. 10B is a partially enlarged view of the barcode. FIG. 10C shows an output signal from a photodiode or the like which receives lights reflected from the barcode when the laser beam scans the line P in FIG. 10B. When the output signal is binary coded by a threshold value Th, a signal having a waveform shown in FIG. 10D can be obtained. The content of the barcode can be recognized by decoding the signal.

Figure 11A:
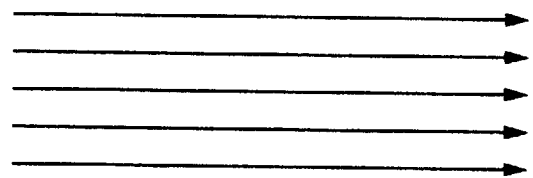
FIGS. 11A and 11B are views explanatory of examples of the scanning method of a barcode scanner.
Figure 11B:
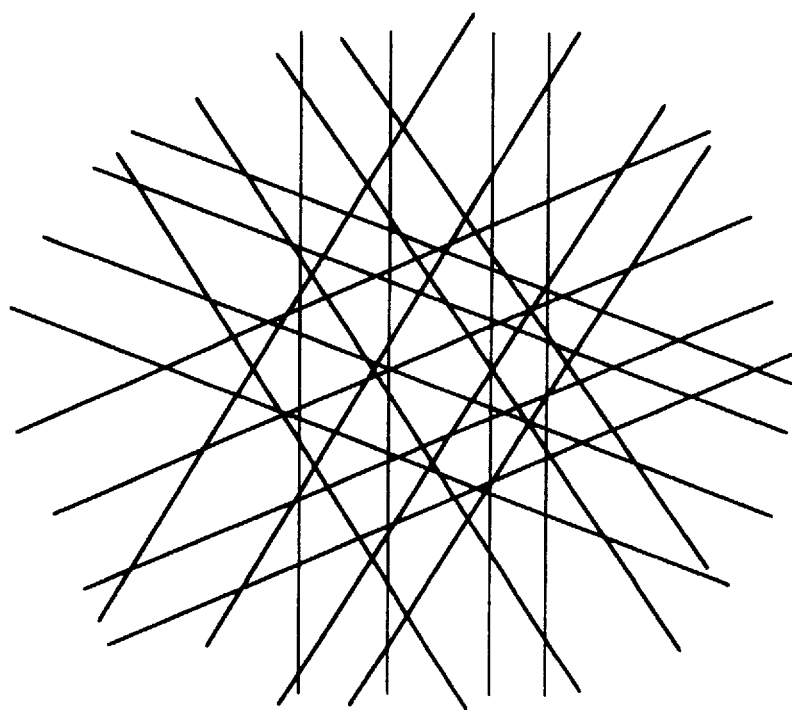

A barcode scanning method includes a multi-scanning method as shown in FIG. 11B which uses a rotary polygon mirror in combination with a plurality of fixed mirrors, in addition to a one-direction parallel scanning method as shown in FIG. 11A. The employment of the multi-scanning method enables the barcodes attached to commodities and the like to be recognized even if the barcodes are directed in any direction.

In the present invention, the barcode scanner 3a is disposed to scan the upper surface of a commodity and the barcode scanners 3b and 3c are disposed to scan the side surfaces of the commodity so as to improve the reading success ratio of them, respectively.

Figure 5:
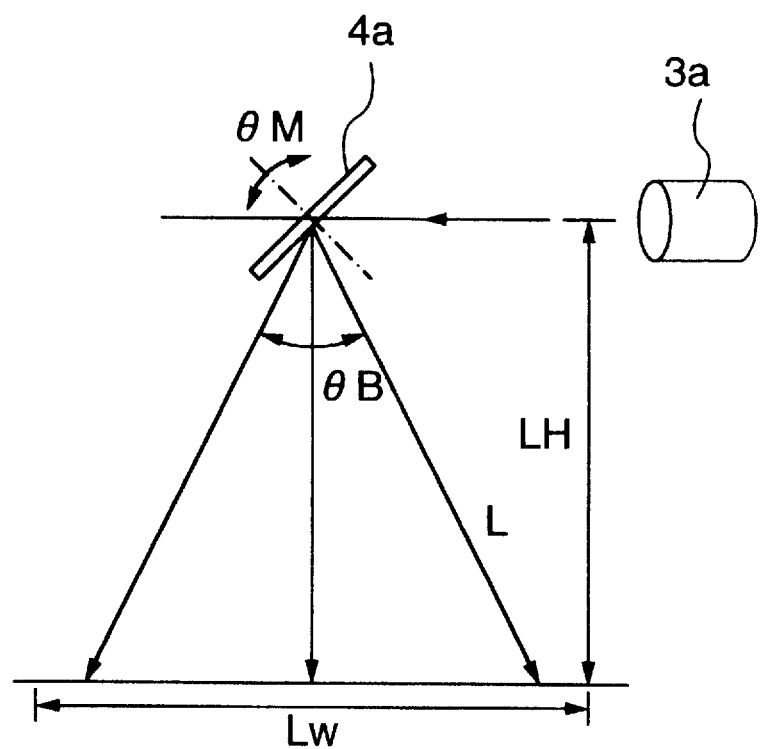
FIG. 5 is a view explanatory of enlarging the reading area of a barcode scanner in a focal position adjusting means according to the embodiment of the present invention.

FIG. 5 is a view explanatory of an example of a method of causing the reading area of a barcode scanner to cover the entire width of a conveying passage. As shown in FIG. 5, a laser beam emitted from the barcode scanner 3a is reflected by the mirror 4a to deflect its light path so that the light path is aligned with the center position of a commodity previously detected by the TV camera 5.

When the mirror 4a is rotated at an angle θM, the swing angle θB of a scan beam is expressed by the following formula (2).

$$\theta B = 2\theta M \quad (2)$$

As described above, the mirror 4a reflects the laser beam for detecting the barcode as well as changes the light path of the laser beam and further aligns the scanning center of the barcode scanner with the upper surface center and side surface centers of the commodity or the like by changing the mirror surface angle of the mirror 4a. Therefore, a wide area in the width direction of the conveying passage can be covered and a high speed response is made possible by controlling the mirror 4a which is more light in weight than the barcode scanner. Note, LH denotes the height of the mirror 4a from the conveying passage in FIG. 5.

When the barcode attached to the side of the commodity or the like is to be detected, a height one half that of the commodity detected by the height sensor 6 is set as the scanning center of the barcode scanner and the angles of the side detecting mirrors 4b and 4c are controlled in alignment with the scanning center of the barcode scanner. A stepping motor or the like can be used to control the mirrors.

Note, although a mirror angle is one-dimensionally changed in FIG. 1, it may be made two-dimensionally variable to cope with a curved article.

Figure 6A:
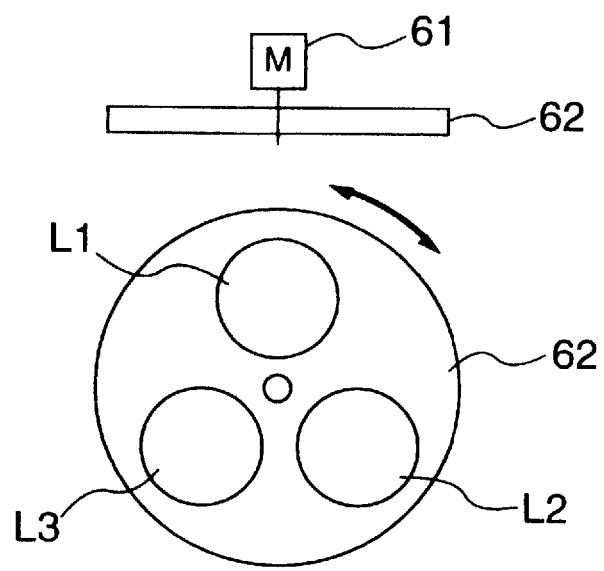
FIG. 6A and FIG. 6B are schematic views explanatory of a method of adjusting a focal distance in the focal position adjusting means according to the embodiment of the present invention.
Figure 6B:
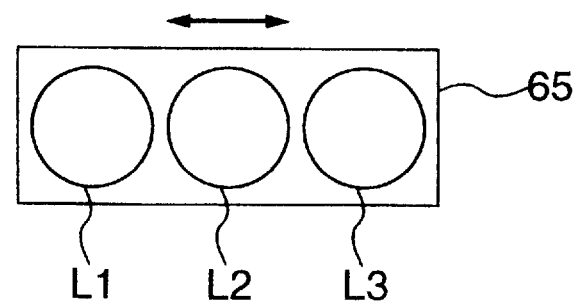

FIGS. 6A and 6B are views explanatory of an example of a focal distance adjusting means in the barcode scanner. The focal distance adjusting means is arranged such that a lens L1 having a long laser focal distance, a lens L2 having a medium laser focal distance, and a lens L3 having a short laser focal distance are disposed to detect a barcode and a focal distance is adjusted by switching these lenses L1, L2 and L3 based on the result of detection effected by the height sensor 6 and TV camera 5.

A focal distance detecting means for the barcode scanner 3a for detecting the barcode attached to the upper surface of the commodity or the like calculates a distance from the commodity to the barcode scanner 3a from the height and upper surface center of the commodity. On the other hand, a focal distance detecting means for the barcode scanners 3b and 3c for detecting the barcode attached to the side of the commodity or the like calculates distances from the commodity to the barcode scanners 3b and 3c from the side surface centers, i.e. (for example, one half the heights of the commodity) and the side position of the commodity (for example, d1 in FIG. 4), respectively.

The focal position of the barcode scanner can be focused on a calculated distance by switching a plurality of the lenses L1, L2 and L3 each having a different focal distance shown in FIGS. 6A and 6B in accordance with the calculated distance.

A plurality of the lenses each having the different focal distance can be switched by rotating the lenses L1, L2 and L3 mounted on a disk 62 as shown in FIG. 6A by a motor 61. Further, as shown in FIG. 6B, the lenses L1, L2 and L3 can be switched by mounting them on a plate and sliding the plate by a solenoid or the like.

Such a lens switching unit may be interposed among the light emitting laser diode for the barcode scanner, the laser beam detecting phototransistor and the polygon mirror (not shown) for causing a laser beam to effect scanning operation.

Note, although an arithmetic control unit composed of a microcomputer is used to calculate the distance from the commodity to the barcode scanners 3a, 3b and 3c, calculate and control the rotational angles of the mirrors 4a, 4b and 4c, control the belt conveyor 1 and the barcode scanners 3a, 3b and 3c, and recognize the barcode scanners 3a, 3b and 3c, the arithmetic control unit is not specifically shown here. Further, a universal personal computer provided with an I/O interface may be used.

Figure 7:
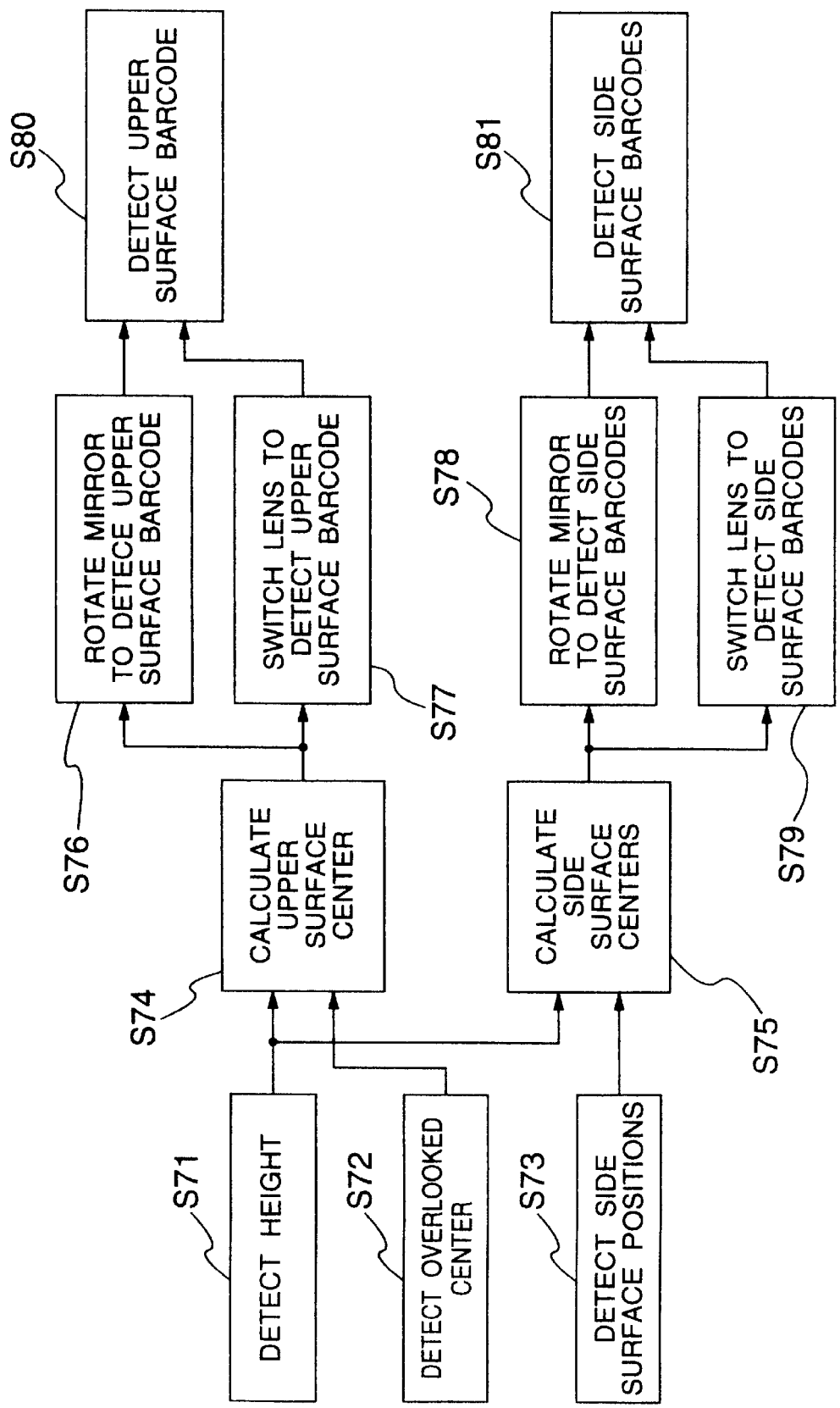
FIG. 7 is a block diagram showing a processing sequence for recognizing a barcode in the automatic barcode recognizing apparatus.

FIG. 7 is a block diagram showing a processing sequence for recognizing a barcode in the automatic barcode recognizing apparatus. When a barcode attached to the upper surface of an object such as a commodity or the like is to be detected, the height of the object is detected (S71) as well as the center of the object when observed from an overlooking position is detected (S72) and the upper surface center of the object is calculated (S74) to thereby calculate a distance from the object to the barcode scanner.

The focal distance is adjusted by switching the lenses of the barcode scanner based on the calculated distance (S77) as well as the mirror is rotated to set the center of detection of the barcode scanner to the center of the object (S76) to thereby detect the barcode on the upper surface of the commodity (S80).

Also with respect to the sides of the objects, the height of the sides and the side positions of the object are detected (S71, S73) to thereby calculate the side surface centers of the object likewise the upper surface (S75). Thus, the focal distance is adjusted by calculating a distance from the object to the barcode scanner and switching the lenses (S79) as well as the center of detection of a laser beam is adjusted by the mirror (S78) to thereby detect the barcode attached to the side of the object (S81).

Although the detection of the barcodes attached to the upper surface and side of the object is described above, only the barcode on the upper surface or side may be detected depending upon an article, and when the barcode is attached on a bottom, it may be detected by defining a detecting window to the conveying passage, although this is not particularly described.

With the arrangement as described above, the automatic barcode recognizing apparatus needs only one barcode scanner for each surface and barcodes attached to various types of commodities or the like can be read and recognized with a pinpoint accuracy at a high response speed in a wide area in the width direction of the conveying passage only by the rotation of the mirrors light in weight and switching of the lenses for adjusting a focal distance without the need of moving the heavy barcode scanners upward and downward.

As described above, according to the present invention, since the focal positions of the barcode scanners are focused on the upper surface center and side surface centers of an article based on the results of detection effected by the height detecting means for detecting the height of the article and the conveying state detecting means for detecting how the article placed on the conveying passage is conveyed, there can be provided the automatic barcode recognizing apparatus which can recognize a barcode with a pinpoint accuracy at a high response speed by the small number of the barcode scanners.

Next, an embodiment of a commodity recognizing apparatus of the present invention which recognizes a plurality of commodities at the same time will be described.

Figure 12:
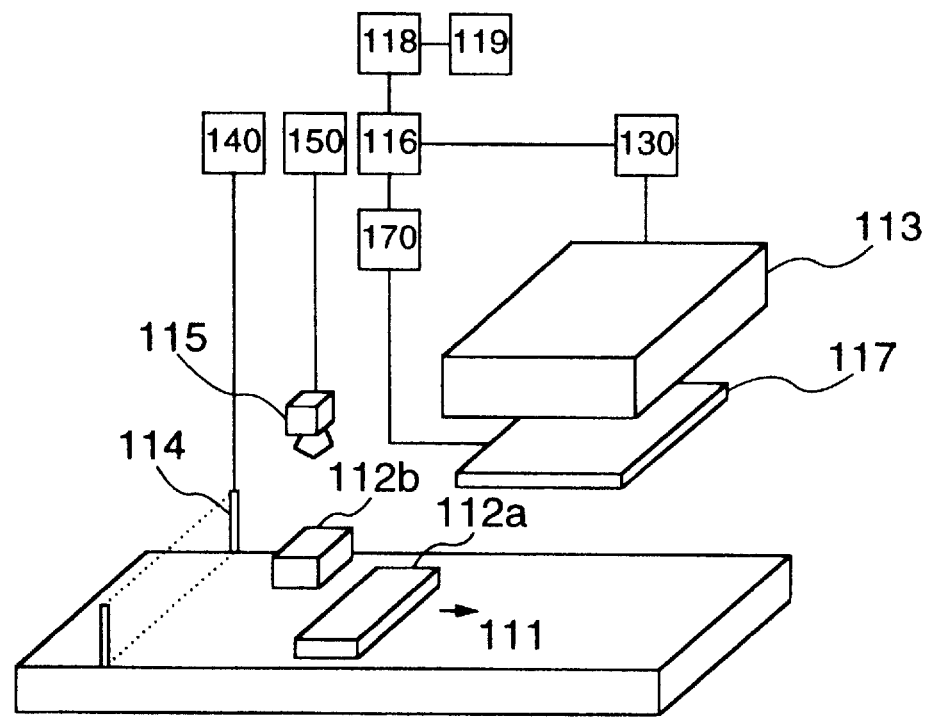
FIG. 12 is a block diagram of an embodiment of a commodity recognizing apparatus of the present invention for simultaneously recognizing a plurality of commodities.

FIG. 12 shows the arrangement of the commodity recognizing apparatus of the embodiment to which the present invention is applied. Numeral 111 denotes a conveying passage for conveying a commodity thrown by a customer. Numerals 112a and 112b denote commodities conveyed on the conveying passage 111 in the direction of an arrow. Numeral 113 denotes a scanner, and numeral 130 denotes a scanner controller which controls the scanner 113 to cause it to read the barcodes of the commodities 112a and 112b and outputs the read result. Numeral 114 denotes a trigger signal creating means and numeral 140 denotes a trigger signal creating means controller. The trigger signal creating means 114 is composed of a plurality of light emitting elements and a plurality of light receiving elements which detect a commodity by being blocked by it. The trigger signal creating means controller 140 outputs a trigger signal when the trigger signal creating means 114 detects the arrival of a commodity and further measures and outputs the height of the commodity being conveyed using the trigger signal creating means 114. Numeral 115 denotes a reading means and numeral 150 denotes a reading means controller. The reading means 115 is disposed upstream of the scanner 113 in a conveying direction on the conveying passage 111 and composed of a two-dimensional CCD camera having a reading area equal to or larger than the reading area of the scanner 113. When a trigger signal is input from the trigger signal creating means controller 140, the reading means controller 150 controls the reading means 115 to cause it to read the shapes of the commodities 112a and 112b conveyed on the conveying passage 111. At the time, the reading means controller 150 subjects an analog signal from the reading means 115 to A/D conversion and outputs a digital signal. Numeral 116 denotes an arithmetic operation means which calculates the region in which the commodities 112a and 112b are present in the reading area of the scanner 113 using the patterns of the commodities 112a and 112b obtained by subjecting the digital signal input from the reading means controller 150 to binary coding and filtering and the heights of the commodities from the trigger signal creating means controller 140. Numeral 117 denotes a reading area limiting means composed of a liquid crystal shutter and numeral 170 denotes a reading area limiting means controller. The reading area limiting means controller 170 controls the reading area limiting means 117 to thereby create a mask pattern for limiting the reading area of the scanner 113 in accordance with the region calculated by the arithmetic operation means 116 in which the commodities 112a and 112b are present. The reading area of the scanner 113 is limited to the region where commodities are present by changing the mask pattern in accordance with the conveyance of respective commodities. Numeral 118 denotes a memory means for storing whether or not the scanner 113 succeeded in reading of the barcodes of the commodities 112a and 112b for each region limited by the reading area limiting means 117. Numeral 119 denotes a register means which registers only the commodities with successfully read barcodes which are stored in the memory means 118. A not shown controller entirely controls the above operation.

Figure 13:
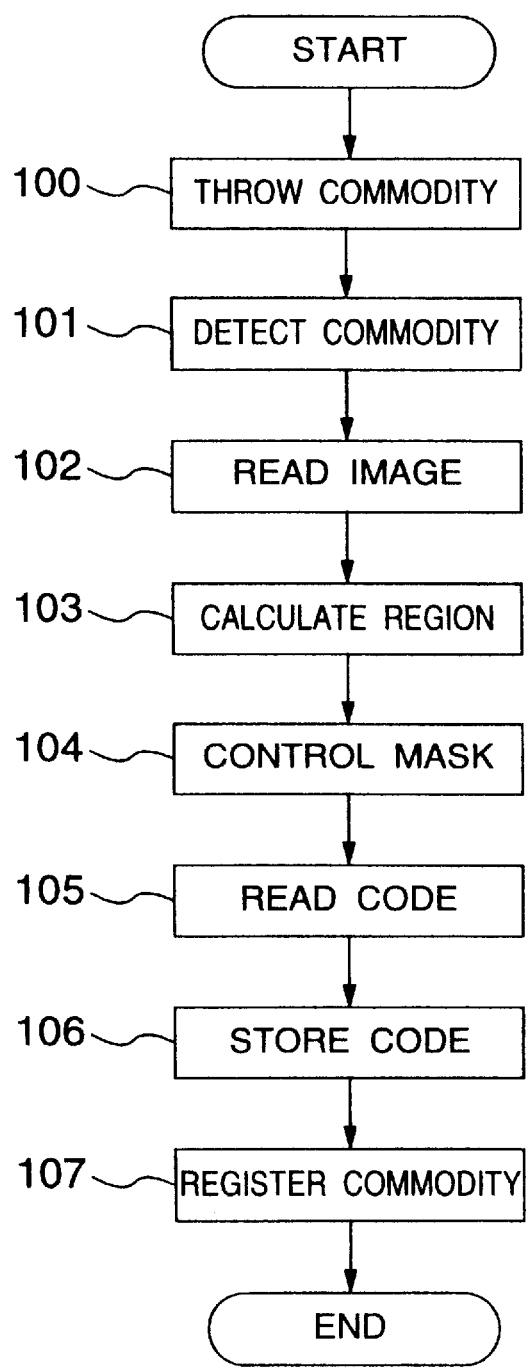
FIG. 13 is a flowchart showing processing effected by the apparatus of FIG. 12.
Figure 14:
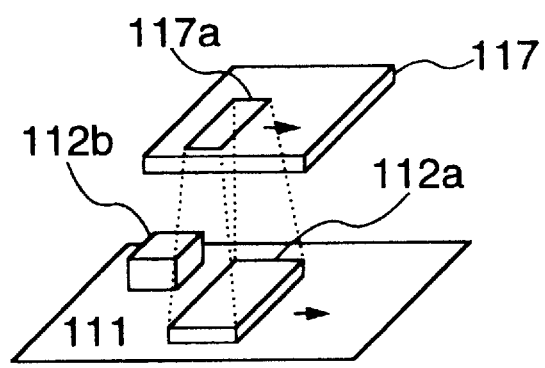
FIG. 14 is a view explanatory of a mask pattern of a reading area restricting means in the apparatus of FIG. 12.
Figure 15:
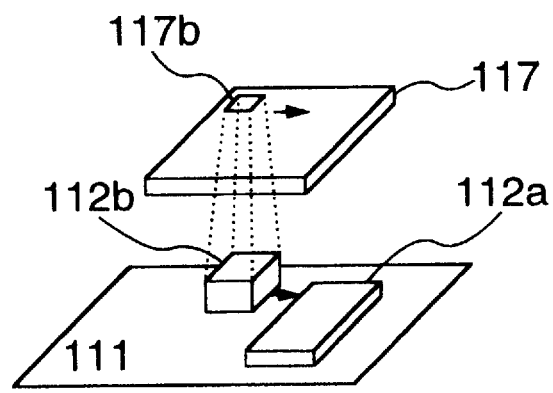
FIG. 15 is a view explanatory of another mask pattern of the reading area restricting means in the apparatus of FIG. 12.

Next, operation of the embodiment shown in FIG. 12 will be described with reference to a processing flowchart shown in FIG. 13. When the customer throws the commodities 112a and 112b onto the conveying passage 111 (step 100), the commodities 112a and 112b are conveyed on the conveying passage 111 in the direction of the arrow and the commodity 112a reaches the trigger signal creating means 114. When the trigger signal creating means 114 detects the commodity 112a, the trigger signal creating means controller 140 outputs a trigger signal to the reading means controller 150. Further, the trigger signal creating means controller 140 measures and outputs the heights of the commodities 112a and 112b using the trigger signal creating means 114 (step 101). When the trigger signal is input, the reading means controller 150 controls the reading means 115 to cause it to read the images of the commodities 112a and 112b on the conveying passage 111 and outputs digital signals (step 102). The heights of the commodities 112a and 112b measured by the trigger signal creating means controller 140 and the images thereof read by the reading means 115 are input to the arithmetic operation means 116 which calculates the region in which the commodities 112a and 112b are present in the reading area of the scanner 113 (step 103). When the arithmetic operation means 116 calculates the region in which the commodities 112a and 112b are present, the reading area limiting means controller 170 controls the reading area limiting means 117 to creates a mask pattern for limiting the reading area of the scanner 113 in accordance with the region calculated by the arithmetic operation means 116 in which the commodities 112a and 112b are present as well as controls the mask pattern so that it changes in accordance with the conveyance of the commodities 112a and 112b (step 104). FIG. 14 shows the mask pattern for the commodity 112a. The reading area limiting means 117 creates a window 117a only to the region where the commodity 112a is present, the scanner 113 reads only the barcode of the commodity 112a and does not read the barcode of the commodity 112b and the window 117a moves in the direction of the arrow likewise the conveyance of the commodity 112a. FIG. 15 shows the mask pattern for the commodity 112b. The reading area limiting means 117 creates a window 117b only to the region where the commodity 112b is present, the scanner 113 reads only the barcode of the commodity 112b and does not read the barcode of the commodity 112a and the window 117b moves in the direction of the arrow likewise the conveyance of the commodity 112b. The reading area limiting means controller 170 controls the mask pattern in such a manner that when only one commodity is present in the reading area of the scanner 113, only a window corresponding to the commodity is opened, and when a plurality of commodities are present in the reading area of the scanner 113, windows corresponding to the respective commodities are sequentially opened by switching them within a predetermined period of time in correspondence to the number of scannings effected by the scanner 113 and the barcodes of the commodities present in the open window are read by the scanner 113 (step 105). The memory means 118 stores whether or not the scanner 113 succeeds in reading of the barcodes of the commodities 112a and 112b in each region limited by the reading area limiting means 117 (step 106). The register means 119 registers only the commodities with successfully read barcodes which were stored in the memory means 118 (step 107). The commodity whose barcode could not be read is returned to the customer without being registered.

According to the present invention, since barcodes can be read by the scanner in a region which is limited to the region where commodities thrown by the customer are present in the reading area of the scanner and the commodities are recognized, there is an advantage that the commodities can be correctly recognized.

Although this embodiment describes a case that two commodities are present to be conveyed, it suffices only that a region where commodities are present in the reading area of the scanner can be calculated even if three or more commodities are present. If the region where commodities are present cannot be calculated by the reading effected once by the reading means, it suffices only to continuously read images from the reading means, synthesize the read images and calculate the region where commodities are present using the synthesized image.

Further, although the windows on the mask pattern are switched each predetermined time in this embodiment, the present invention is not limited thereto but they may be switched at random or switched after barcodes in a window are read. Further, although the window in the mask pattern is moved and the scanner is fixed when a barcode is read, the present invention is not limited thereto but a barcode reading time may be shortened in such a manner that a plurality of the scanning lines of the scanner scans the interior of the window in a short time by controlling the scanner so that it rotates about an axis vertical or parallel to the scanning surface of the scanner or to effect raster scanning. Further, the reading area limiting means to which a mask pattern is fixed and the scanner may be integrally moved following the conveyance of commodities.

Further, although the trigger signal creating means also serves as the height measuring means in this embodiment, independent means may be used so long as they can detect a commodity and measure the height of the commodity to create a trigger signal. Although the single two-dimensional CCD camera is used as the reading means, the present invention is not limited thereto but a plurality of cameras may be used and the CCD camera may be a one-dimensional camera. Further, the present invention is not limited to the CCD camera but any device may be used so long as it can read the image of a commodity. Further, although the liquid crystal shutter is used as the reading area limiting means to change the mask pattern in accordance with the conveyance of commodities, the present invention is not limited thereto but an optical system such as lenses, mirrors and the like may be used so long as it can limit the reading area of the scanner.

According to the present invention, since the barcodes of a plurality of commodities, which are present in the reading area of the scanner at the same time because they are simultaneously or continuously thrown by a customer, can be recognized respectively and thereafter the recognition processing of the commodities can be carried out, the commodities can be correctly recognized at a high speed.

Figure 16:
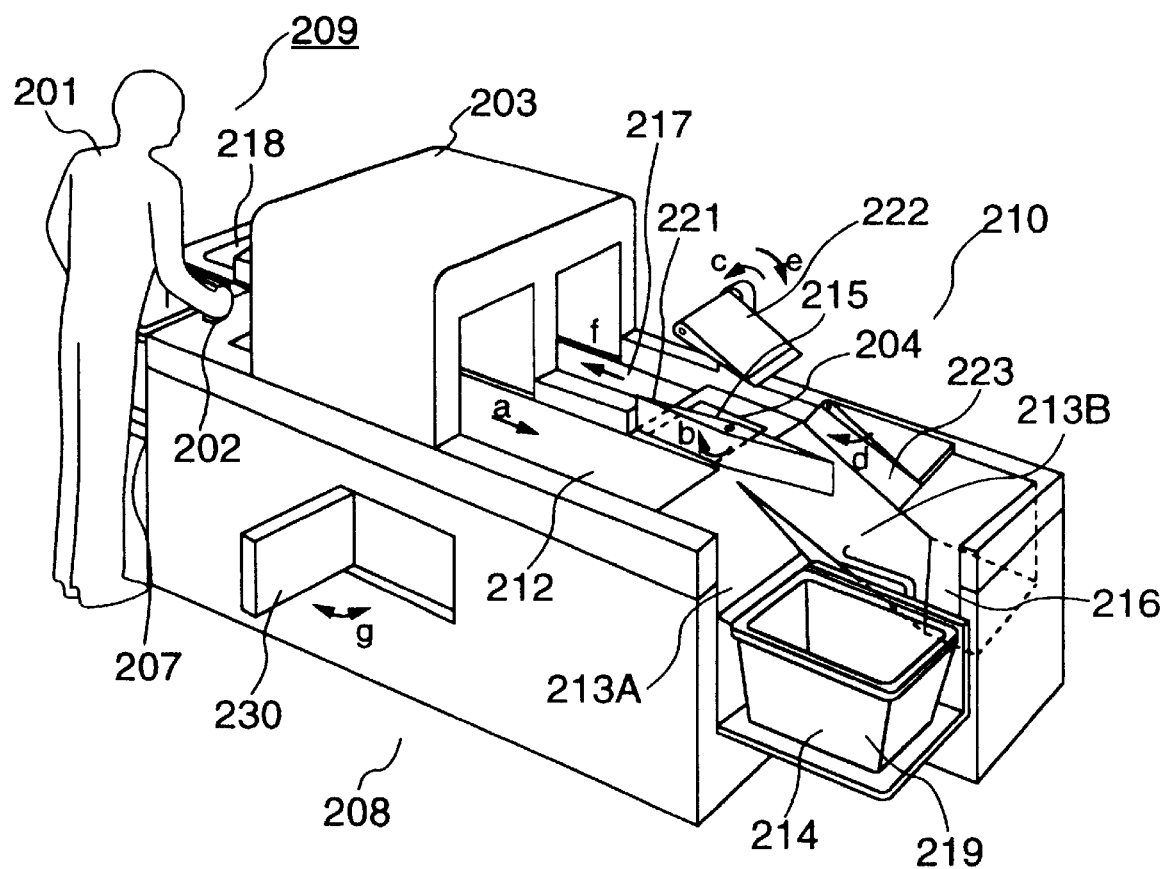
FIG. 16 is a perspective view of an embodiment of an automatic clearing-off device which need not interrupt commodity processing operation even if there is a commodity from which a barcode cannot be read.
Figure 17:
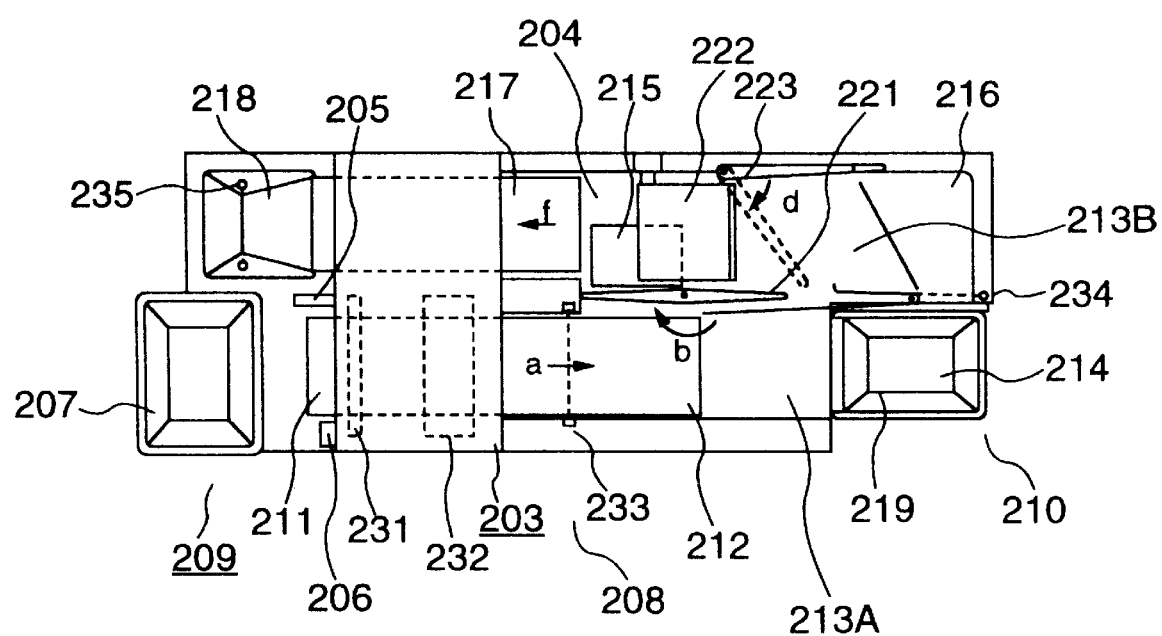
FIG. 17 is an upper plan view of the embodiment of FIG. 16.

Next, an embodiment of an automatic clearingoff apparatus for commodities according to the present invention, which need not interrupt commodity processing operation even if there is a commodity from which a barcode cannot be read, will be described. FIG. 16 is perspective view of the embodiment of the automatic clearing-off apparatus according to the present invention and FIG. 17 is an upper plan view of the embodiment.

This apparatus is composed of an operation unit 209 through which a customer throws a commodity, a reading unit 203 for reading the barcode of the thrown commodity when it is conveyed by a conveyor belt 212, a commodity accommodating vessel 214 for accommodating the commodity when the barcode of the commodity is normally read and unless the commodity is fragile (commodity liable to be broken), a re-reading unit 204 for reading the barcode when it could not read, a return belt 217 for returning the commodity from which the barcode could not be re-read to the operation unit 209, a fragile article accommodating vessel 216 for accommodating a fragile commodity returned to the re-reading unit 204, the conveyor belt 212, rotatable sorting plates 221, 222 and 223 for moving commodities between the re-reading unit 204, return belt 217, accommodating vessels 214, 216, and the like.

Figure 18:
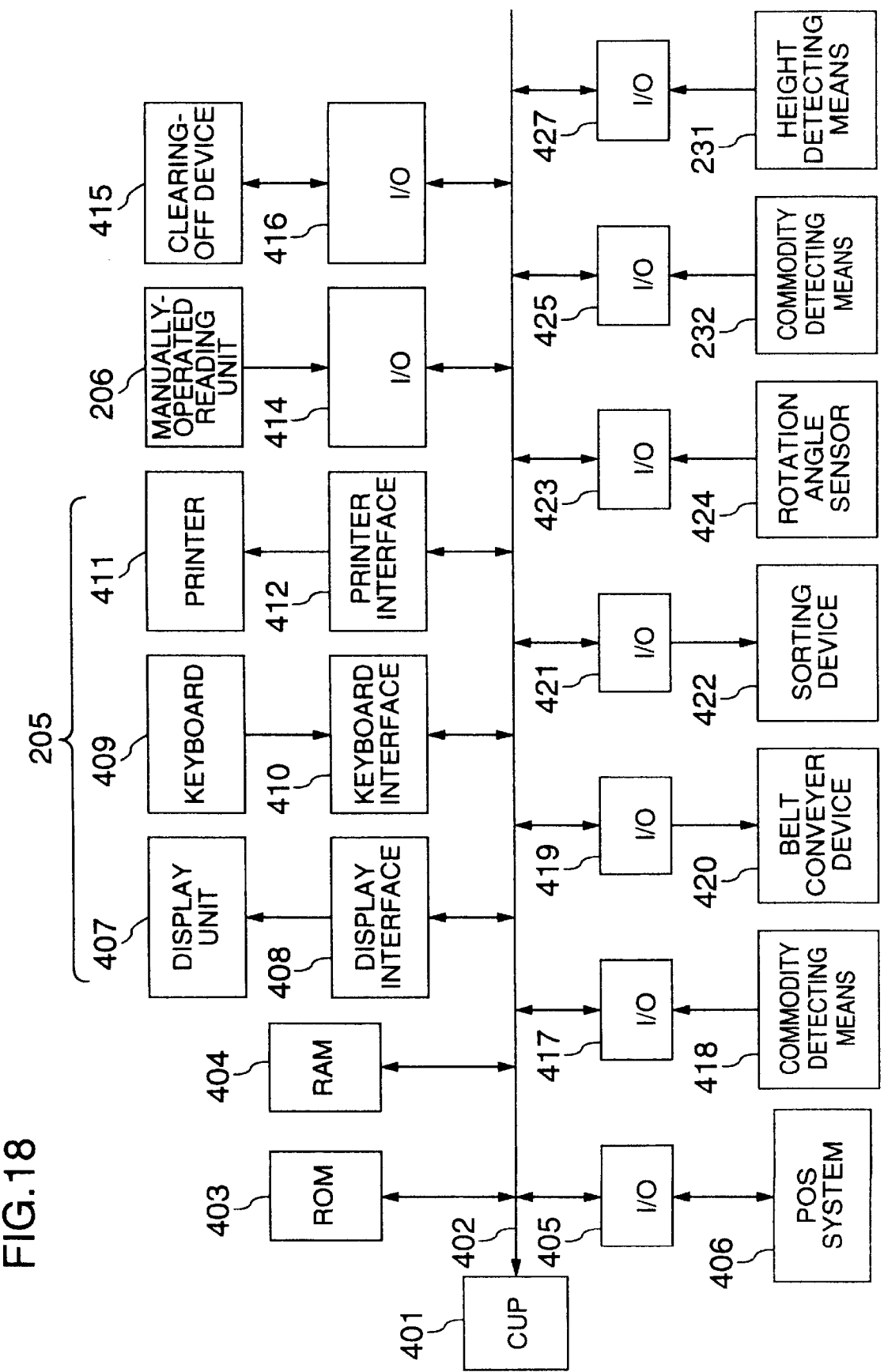
FIG. 18 is a block diagram of a control circuit of the embodiment of FIG. 16.

FIG. 18 is a block diagram of a control circuit for controlling operation of the apparatus of this embodiment. The CPU (central processing unit) and interface of the control circuit is disposed in the interior of the apparatus shown in FIG. 16 (omitted in FIG. 16).

In FIG. 18, the CPU 401 for controlling the apparatus is interconnected through a pipe line 402 to a ROM (read only memory) 403, a RAM (random access memory) 404, a display interface 408, a keyboard interface 410, a printer interface 412, I/Os 405, 414, 416, 417, 419, 421, 423, 425, and 427.

The ROM 403 stores a program, data and the like through which the CPU 401 controls the apparatus. The RAM 404 stores barcodes read and the like. A display unit 407 for displaying a commodity throwing instruction, clearing-off amounts of money and the like is connected to the display interface 408. A keyboard 409 through which a commodity price is input and the completion of commodity throwing operation is instructed is connected to the keyboard interface 410. A printer 411 for outputting a receipt on which the price of each thrown commodity, an amount of money to be cleared off and the like are shown is connected to the printer interface 412. These display unit 407, keyboard 409 and printer 411 are disposed to an operator's console 205 shown in FIG. 17.

A manually-operated reading unit 206, which is operated by a customer 201 or a store clear to read commodity data when the data is impossible to be read, is connected to the I/O 414. A clearing-off device 415 for effecting clearing off by a cash card, prepaid card, cash or the like is connected to the I/O 416 (omitted in FIG. 16). A commodity detecting means 418 such as commodity detecting sensors 234 and 235 and the like (commodity detecting sensors 234 and 235 in FIG. 17) are connected to the I/O 417.

A belt conveyor means 420 composed of motors and the like for driving the conveyor belt 212 and return belt 217 is connected to the I/O 419. A sorting device 422 composed of motors and the like for rotating sorting plates 221, 222 and 223 are connected to the I/O 421. A rotation angle sensor 424 (omitted in FIG. 16) for detecting the rotation angles of the respective motors of the sorting device is connected to the I/O 423. A commodity detecting means 232 for detecting a commodity contour and reading a commodity barcode is connected to the I/O 425. A commodity height detecting means 231 for detecting throwing of a commodity, the height of the commodity and the interval between commodities is connected to the I/O 427. A POS (point of sales management) system 406 for adding up the data of commodities handled by the respective devices is connected to the I/O 405.

Figure 19A:
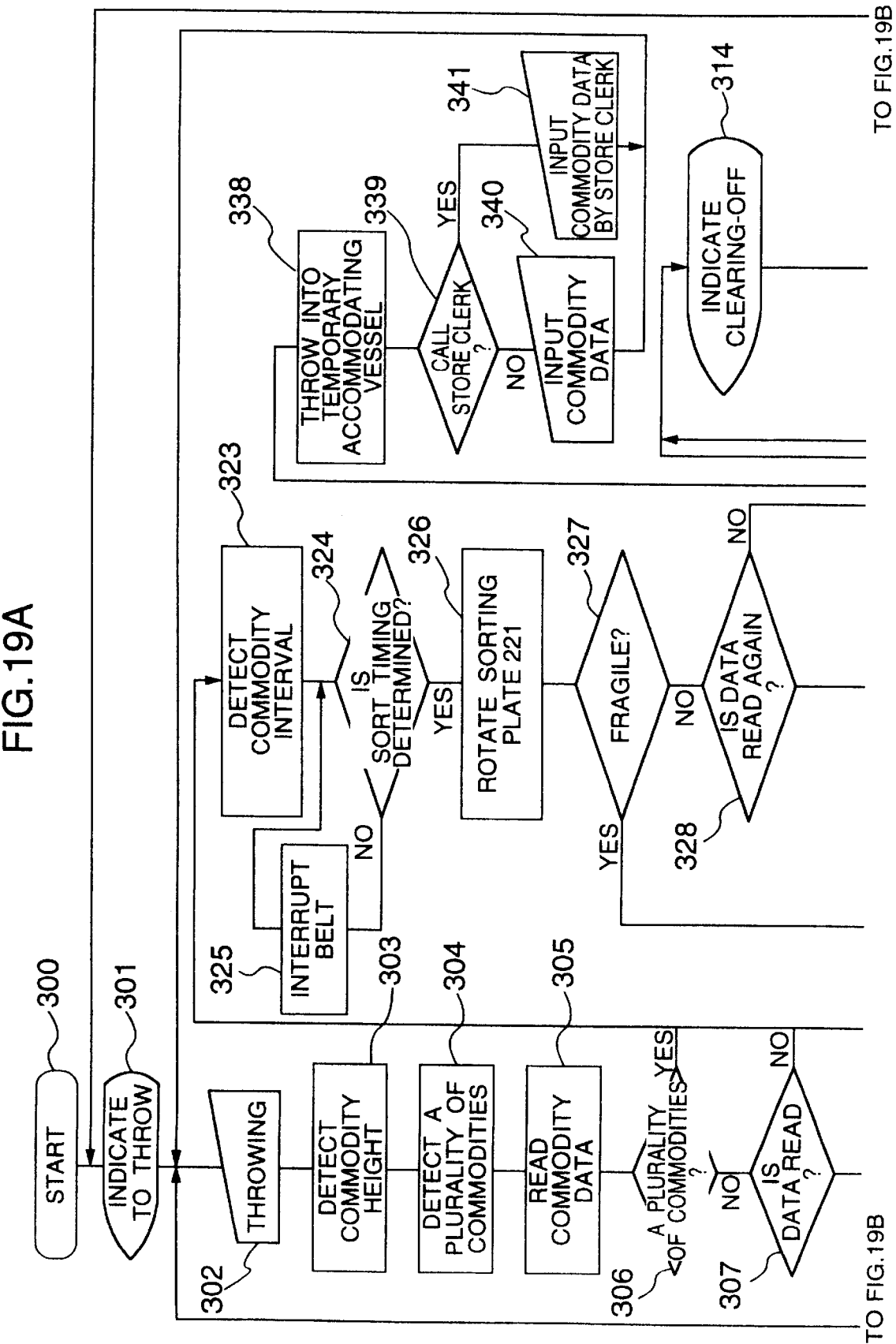

FIGS. 19A and 19B are flowcharts showing operation of this embodiment which is controlled by the control circuit shown in FIG. 18. The operation of this embodiment will be described with reference to FIGS. 16 and 17.

When the customer 201 approaches the operation unit 209, the apparatus is started and the conveyor belt 212 and return belt 217 start operation (step 300). This start can be carried out by the same method as that of an automatic door. The operation unit 209 includes the operator's console 205 composed of the keyboard and the display unit, a speaker and the like, the manually-operated reading unit 206 for manually reading barcodes by a conventional manner and a commodity throwing port 211. When the apparatus is started, an image for instructing to throw a commodity is displayed on the display unit on the operator's console 205 as well as the instruction is also made by a voice from the speaker (step 301).

The thrown commodity is conveyed to the reading unit 203 where the throwing of the commodity, the height of the thrown commodity and the interval of the commodity in its conveying direction are detected by the height detecting means 231 and further the commodity contour and barcode are read by the commodity detecting means 232. Further, the detection of the commodity contours enables the correspondence between continuously conveyed commodities and read barcodes to be correctly established. That is, a plurality of commodities which are conveyed vertically in a conveying direction side by side can be detected by the detection of the intervals between the commodities in the conveying direction thereof and the detection of commodity contours (steps 303 to 305).

Further, when a plurality of commodities are thrown at the same time and located very near to each other in the conveying direction, since it is impossible to discriminate commodity data and sort the commodities, it is determined whether they are a plurality of the commodities or a single commodity from the data read with respect to commodity intervals (step 304).

Next, when the commodity satisfies the following conditions: the commodity is not a plurality of commodities at step 306; barcode is successfully read and data is successfully read in a commodity data reading process at step 307;

when height data previously input in commodity data is fetched from the read data and a difference between the height data and the commodity height detected at step 303 is compared, the difference is within an allowable range at step 308; and data indicating a fragile article in the commodity data does not indicate that the commodity is fragile at step 309, the commodity slides down on a conveying slope 213A from the conveyor belt 212 and thrown into the commodity accommodating vessel 214. When the commodity accommodating vessel 214 is arranged as a carrying-back shopping basket 219 or a carrying-back shopping bag as shown in the drawing, commodities need not be repacked from the commodity accommodating vessel 214 and thus an efficiency can be improved.

Note, a reason why the height direction data is checked is to prevent piled commodities from being usually recognized as a single commodity because it is difficult to recognize the piled commodities as a plurality of commodities. If the pile commodities are recognized as a single commodity, they are processed based on the commodity data of the uppermost commodity and the prices of the commodities other than the uppermost commodity are not added. To cope with this problem, height information is input to the commodity data and when a detected height is different from the height information, that is, it is contemplated that a plurality of commodities are piled, these commodities are bypassed and operation for them is effected again as described below.

Further, to prevent fragile articles from being damaged, the accommodating vessel for the fragile articles are prepared independently of the accommodating vessel for ordinary commodities. Thus, whether a commodity is fragile or not is determined from the commodity data.

When the commodity is recognized as a plurality of commodities in steps 306 to 309, if data cannot be successfully read, the commodity height difference is outside of the allowable range or the commodity is determined fragile from the commodity data, the process goes to step 323. In this case, an interval between commodities being conveyed is detected by a commodity interval sensor 233 and it is determined whether the detected interval is sufficient for the sorting plate 221 to sort a next commodity (step 324). When it is determined difficult to process the next commodity within the time, the conveyor belt 212 is interrupted once to secure a time for sorting operation (step 325). Then, the sorting plate 221 is rotated in the direction of an arrow b in the drawing to move the commodity from the conveyor belt 212 to the re-reading unit 204 (step 326). The commodity interval sensor 233 is arranged such that a light receiving unit and a light emitting unit are disposed on the opposite sides of the conveyor belt so as to detect the interval of a commodity passing therebetween in such a manner that the commodity blocks an optical axis between the units.

When the commodity is transferred to the re-reading unit 204, if the commodity data of the commodity is already read and it is determined fragile (step 327), the sorting plate 222 is rotated in the direction of an arrow c in the drawing (step 334) and the commodity is dropped onto a conveying slope 213B and thrown into the fragile article accommodating vessel 216 (step 335).

When the commodity at the re-reading unit 204 is not fragile or the commodity data thereof is not read, it is determined whether the commodity is a commodity to be read again or not (whether it is a commodity which could not be read or not) (step 328). The commodity which is detected as it is not to be read again, that is, detected as a plurality of commodities or the commodity with its height difference outside of the allowable range is thrown onto the return belt 217 (step 337) by rotating the sorting plate 222 in the direction of the arrow c in the drawing (step 336). When a plurality of commodities are conveyed vertically in the conveying direction side by side without any gap left therebetween in the above direction and thus any one of the commodities must be bypassed, it is difficult to bypass only the commodity. Thus, a commodity group composed of a plurality of the commodities is entirely moved onto the return belt 217. Further, when there is an uncoincided height, since there is a possibility that a plurality of commodities are piled as described above, the commodities are also moved onto the return belt 217.

When the commodity at the re-reading unit 204 is to be read again, it is read again at the re-reading unit 204 (step 329). Since the re-reading unit 204 has an optically transparent bottom plate 215, even commodity data attached to the bottom of a commodity can be read through the bottom plate 215. The conveyor belt 212 is composed of a cloth or the like covered with an elastic material such as rubber or the like to suppress the elongation of the belt within a predetermined amount and secure the life thereof. As a result, the conveyor belt is optically opaque and thus when the surface of a commodity on which a barcode is shown is placed on the conveyor belt 212, the reading unit 204 cannot read the barcode. Since this is a main reason why reading operation fails, a reading success ratio can be greatly improved by reading the bottom of the commodity by the re-reading unit 204.

Then, it is determined whether the barcode of a commodity is read by the re-reading process or not (step 330), and if it is not read, the sorting plate 222 is rotated in the direction of the arrow c in the drawing (step 336) and the commodity is thrown onto the return belt 217 (step 337).

When the barcode is successfully read at the re-reading step 329, the height of the commodity detected at the commodity height detecting step 303 with the commodity height in the data read out (step 331). When the difference therebetween is outside of the allowable range, the commodity is thrown onto the return belt 217 at steps 336 and 337. In addition, although the height of the commodity is within the allowable range, when it is found that the commodity is fragile from the read data (step 332), the commodity is thrown into the fragile article accommodating vessel 216 at steps 334 and 335.

When the barcode of the commodity is read at the re-reading step 329, the difference between the height of the commodity detected and the input height data is found to be within the allowable ranged from the data of the commodity and further the commodity is not fragile, the sorting plate 222 is rotated in the direction of the arrow c in the drawing and the sorting plate 223 is rotated in the direction of an arrow d in the drawing (step 333) and the commodity is thrown into the commodity accommodating vessel 214 (step 310). The operation of the sorting plates 221 to 223 at the above steps 326, 334, 336 and the like will be described in detail later with reference to FIGS. 23 to 29.

The commodity whose data cannot be read even by, the re-reading process (step 329), the commodities conveyed in close proximity to each other and the commodity in which the difference between the height thereof and the height of the commodity data is outside of the allowable range are conveyed by the return belt 217 in the direction of an arrow f and thrown into a temporary accommodating vessel 218 (step 338). When the commodities are thrown into the temporary accommodating vessel 218, the customer 201 selects whether the customer calls a store clerk for inputting commodity data or processes the commodities through the operator's console 205 (step 339). When the customer 201 entrusts the clerk with the processing of the commodities by the selection, the clark inputs commodity data using the keyboard in the operator's console 205, the manually-operated reading device 206 for inputting the commodity data or the like (step 341). When the customer 201 selects to process the commodities, the customer 201 carries out the same operation (step 340) and thereafter the process returns to step 302 to enable a commodity to be thrown onto the conveyor belt 212. The commodity is thrown into the commodity accommodating vessel 214 when it is an ordinary commodity and into the fragile article accommodating vessel 216 when it is fragile, according to input data.

When all the commodities are thrown into any of the commodity accommodating vessel 214 and fragile article accommodating vessel 216 (steps 310 and 335), the prices of these commodities are added and displayed to the customer 201 (step 311). When the customer inputs that all the commodities have been thrown and all the prices have been added through the operator's console 205 (step 312), it is confirmed whether the throwing operation has been completed or not (step 313), and when the throwing operation has been completed, the customer is instructed to make clearing-off through the display of the operator's console 205 (step 314). When the customer makes the clearing-off by a cash card or cash in response to the instruction (step 315), it is determined whether the clearing-off has been completed or not (step 316), and when the clearing-off has been completed, the conveyor belt 212 is stopped (step 317) and displays to wait the throwing of commodity to prevent a next customer from throwing a commodity (step 318). Then, a gate 230 is rotated in the direction of an arrow g in the drawing (step 319) so that the customer passes through a passage 208 and receives the commodities from the commodity accommodating vessel 214 and the fragile article accommodating vessel 216 at a commodity receiving portion 210.

Further, when the customer carries back the commodities (step 320), it is determined whether or not any commodities are left in the commodity accommodating vessel 214, fragile article accommodating vessel 216 and temporary accommodating vessel 218 (step 321) and when there are left any commodities, it is notified to the customer by a voice or the like (step 322). The notification of the left commodities is carried out by a commodity detecting sensor 234 disposed on the lowermost portion of the fragile article accommodating vessel 216, a commodity detecting sensor 235 disposed on the lowermost portion of the temporary accommodating vessel 218, and a weight sensor (not shown) disposed to the commodity accommodating vessel 214. However, each of the commodity detecting sensors 234 and 235 is arranged such that a light receiving unit and a light emitting unit are disposed on the opposite sides of the accommodating vessel so as to detect the presence of a commodity in such a manner that the commodity blocks an optical axis between the units, and the weight sensor detects that the carrying-back shipping basket 219 is taken out from the commodity accommodating vessel 214 by means of weight. The next customer is instructed to throw a commodity when it is determined that all the commodities have been carried back so as to prevent the commodity of the next customer from being mixed with the commodities of the previous customer.

Next, commodity sorting operation effected by the sorting plates 221 to 223 at steps 326, 333, 334 and 336 will be described with reference to FIGS. 23 to 29.

Figure 23:
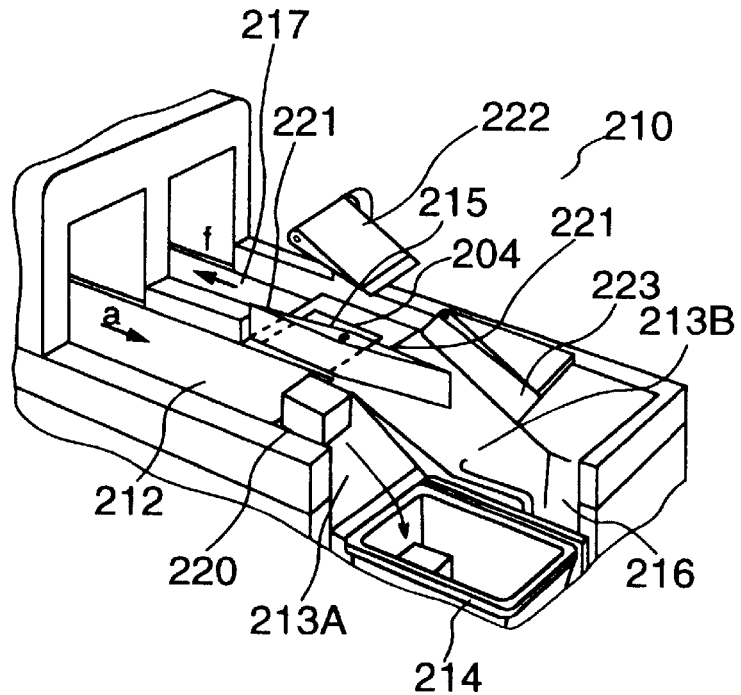
FIG. 23 is a view explanatory of commodity sorting operation in the embodiment of FIG. 16.

FIG. 23 shows a case that commodity data is successfully read and the difference between the commodity height data in the read data and the commodity height read by the commodity height detecting means 231 is within the allowable range and also shows the flow of an unfragile commodity. In this case, a commodity 220 is conveyed on the belt 212, slides down on the conveying slope 213A and is accumulated in the commodity accommodating vessel 214.

Figure 24:
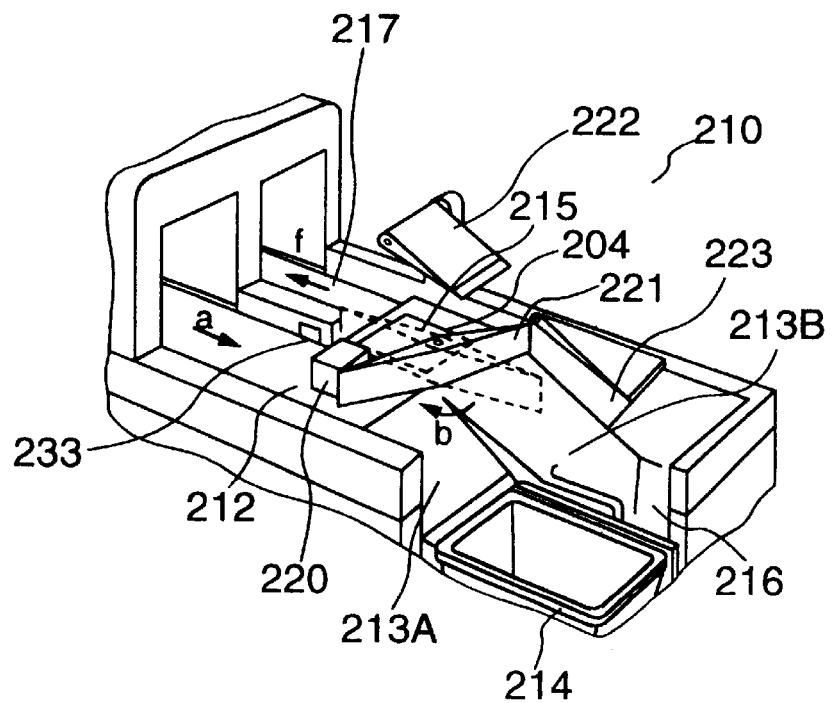
FIG. 24 is a view explanatory of commodity sorting operation in the embodiment of FIG. 16.
Figure 25:
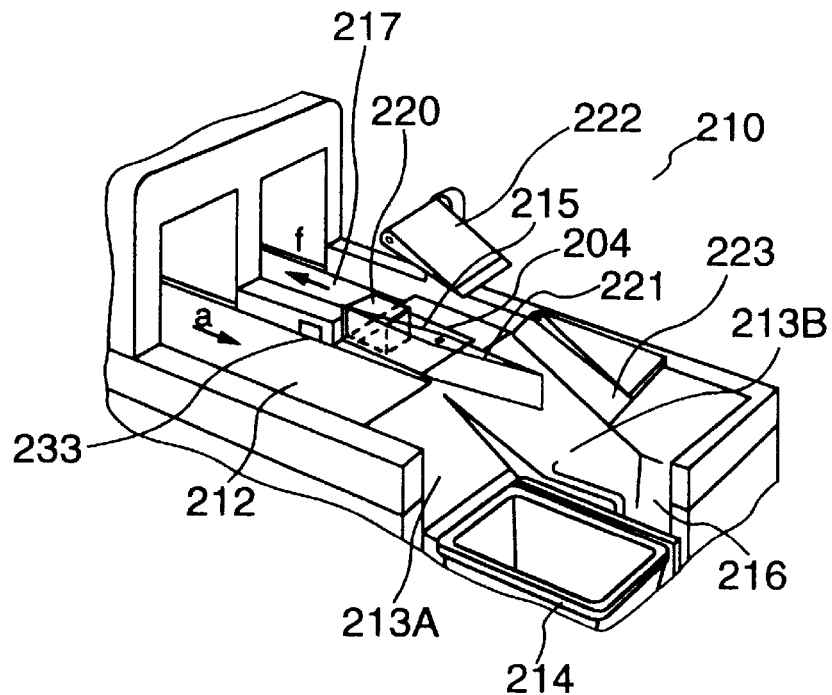
FIG. 25 is a view explanatory of commodity sorting operation in the embodiment of FIG. 16.

FIGS. 24 and 25 show the operation for bypassing from the conveying belt 212 a commodity whose data could not be successfully read, a commodity group recognized as a plurality of commodities, a commodity determined as a fragile article from a read barcode and a commodity whose data could be successfully read but in which the difference between commodity height data and the height of the commodity detected by the commodity height detecting means 231 was outside of the allowable range (step 326 of FIG. 19). In this case, when it is confirmed by the commodity interval sensor 233 detecting the commodity 220 passed that the commodity 220 has moved to a position where it can be sorted, the sorting plate 221 is rotated (FIG. 24) in the direction of the arrow b from a waiting position shown by a dotted line (position in FIGS. 16 and 17) to bypass the commodity 220 to the re-reading unit 204 (FIG. 25). When the data fails to be read, it is read again there.

Figure 26:
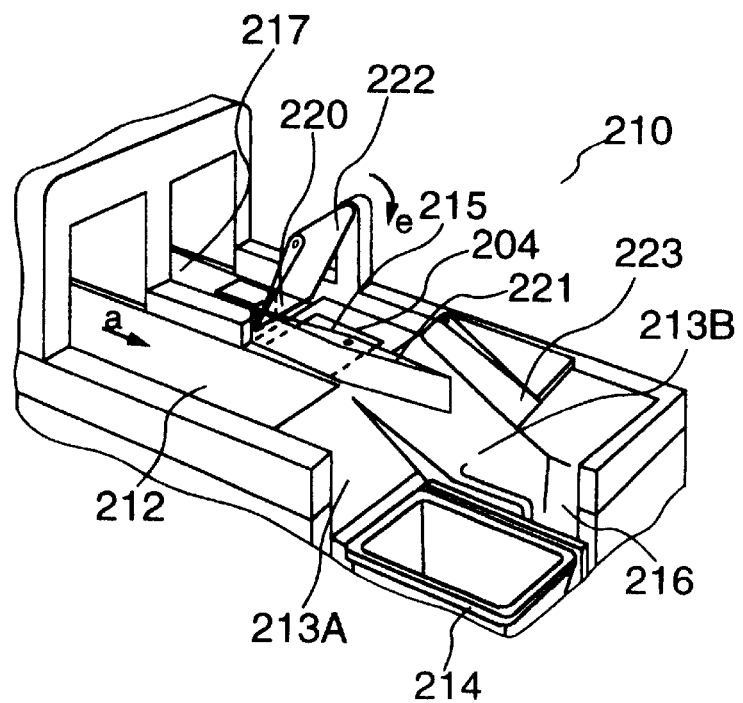
FIG. 26 is a view explanatory of commodity sorting operation in the embodiment of FIG. 16.

FIG. 26 shows the operation for returning to the operation unit 209 the commodity 220 bypassed to the re-reading unit 204 but failed to be read again, a commodity group recognized as a plurality of commodities and a commodity whose data could be successfully read or re-read but in which the difference between commodity height data and the height of the commodity detected by the commodity height detecting means 231 was outside of the allowable range. The sorting plate 222 is rotated in the direction of the arrow e in the drawing from the waiting state shown in FIG. 25 to move the commodity or commodities from the re-reading unit 204 to the return belt 217. The return belt 217 returns the commodity to the operation unit 209 by conveying it in the direction of the arrow f to cause the commodity to be re-processed.

Figure 27:
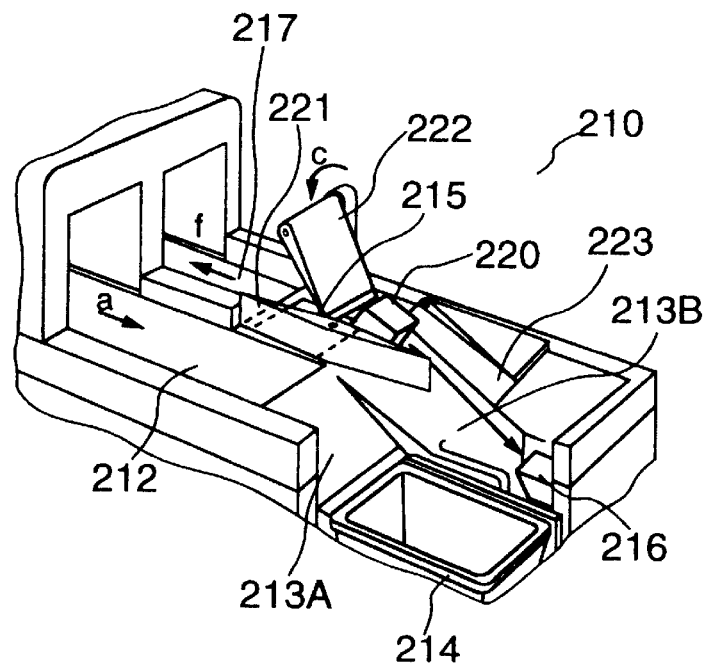
FIG. 27 is a view explanatory of commodity sorting operation in the embodiment of FIG. 16.

FIG. 27 shows the operation for throwing a commodity whose barcode was read by the reading unit 203 or the re-reading unit 204 and determined fragile into the fragile article accommodating vessel 216 (step 334). The sorting plate 222 is rotated in the direction of the arrow c in the drawing from the waiting state shown in FIG. 25 to thereby move the commodity 220 from the re-reading unit 204 onto the conveying slope 213B so that the commodity 220 slides down on the conveying slope 213B and is accumulated in the fragile article accommodating vessel 216.

Figure 28:
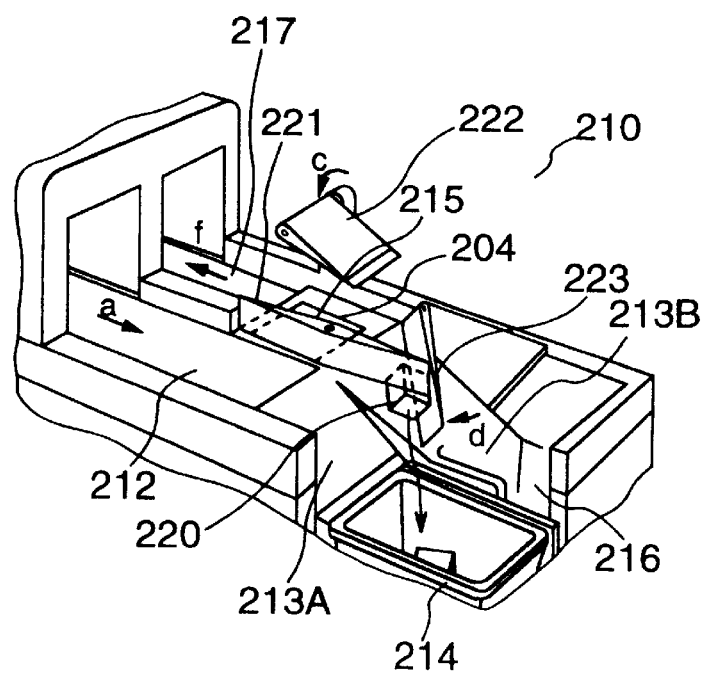
FIG. 28 is a view explanatory of commodity sorting operation in the embodiment of FIG. 16.

FIG. 28 shows the operation for throwing a commodity, when it is determined an unfragile ordinary commodity as a result that its barcode is read, into the commodity accommodating vessel 214 (step 333). For this purpose, the sorting plate 223 is rotated in the direction of the arrow d in the drawing from the waiting position shown in FIG. 27 to the position shown in FIG. 28. Thereafter, the sorting plate 222 is rotated in the direction of the arrow c in the drawing to thereby move the commodity 220 from the conveying slope 213B to the conveying slope 213A. With this operation, the commodity 220 slides down on the conveying slope 213A along the sorting plate 223 and is accumulated in the commodity accommodating vessel 214.

As described above, according to the present invention, when the barcode of a commodity cannot be read, the commodity is moved into the temporary accommodating vessel to prevent the reading unable commodity from being mixed in the commodity accommodating vessel as well as even if there is a reading unable commodity, the conveyor belt can be driven at a predetermined speed without interrupting its operation, so that a processing speed can be increased and a waiting time for clearing-off can be shortened. Further, a reading success ratio can be improved by the provision of the re-reading unit 204 disposed at a certain point in the passage through which the reading unable commodity is moved into the temporary accommodating vessel 218.

Since data for determining whether a commodity is fragile or not is contained in the commodity data and a commodity determined fragile is accumulated in the fragile article accommodating vessel 216 through the gentle slope, the fragile commodity is prevented from dropping and breaking as well as the commodity accommodating vessel can be deepened to accommodate the greater number of commodities, so that a commodity overflowing problem can be solved.

Further, since the temporary accommodating vessel 218 is disposed in the vicinity of the commodity throwing portion, the customer can process reading unable commodities, so that the number of store clerks per unit of the apparatus to support the customer can be reduced and thus personnel expenses can be saved.

Figure 20:
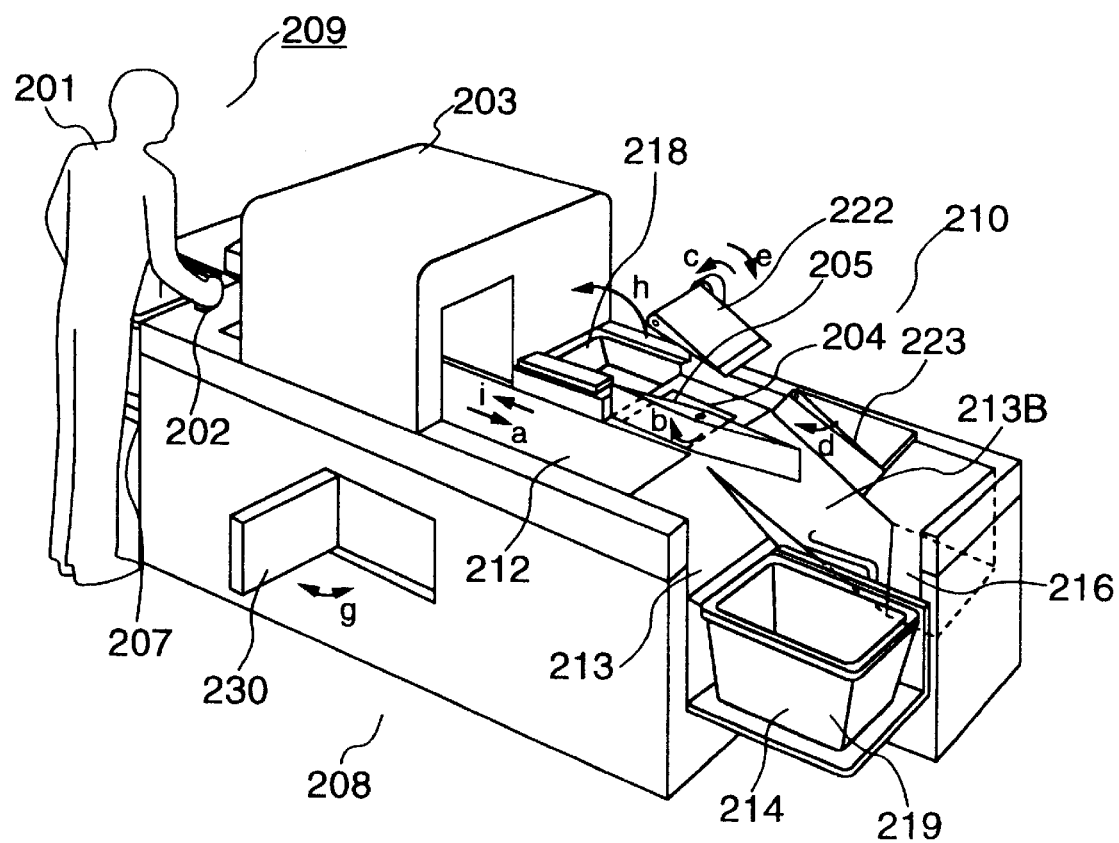
FIG. 20 is a perspective view of another embodiment of the automatic clearing-off device of FIG. 16 which is arranged by partially modifying the device.
Figure 21:
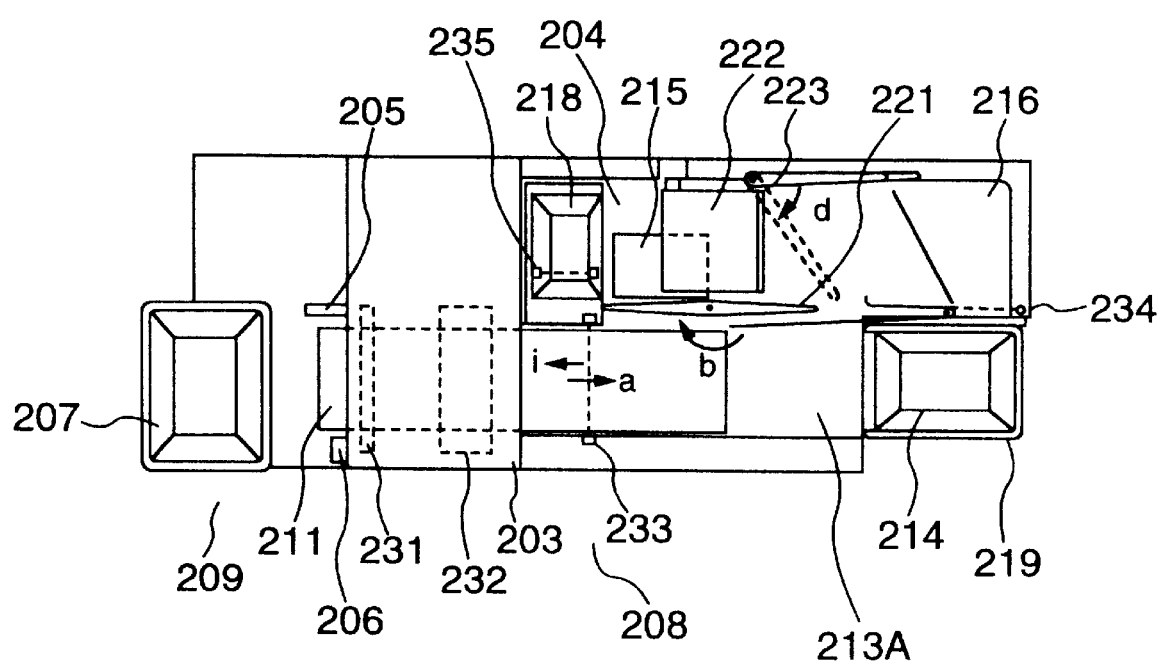
FIG. 21 is an upper plan view of the embodiment of FIG. 20.

Next, another embodiment of the present invention will be described. FIG. 20 is a perspective view of the embodiment and FIG. 21 is an upper plan view thereof. This embodiment is different from the previous embodiment shown in FIGS. 16 and 17 in that the temporary accommodating vessel 218 is disposed in the vicinity of the re-reading unit 204 and the return belt 217 is not provided. The control circuit of this embodiment is approximately similar to that described with reference to FIG. 18. However, this embodiment is different from the previous embodiment in that the sorting device 422 of FIG. 18 includes the motor for rotating the temporary accommodating vessel 218 and the conveying means 420 shown in FIG. 18 does not include the motor for moving the return belt 217 shown in FIGS. 16 and 17 because this embodiment does not include the return belt 217.

FIGS. 22A and 22B are flowcharts showing operation of the embodiment shown in FIGS. 20 and 21. The flowchart of this embodiment is different from that of the previous embodiment shown in FIGS. 19A and 19B in the steps 351 to 354 at which a commodity, if it is accommodated in the temporary accommodating vessel, is returned to the commodity throwing port when the customer 201 indicates the completion of commodity throwing operation (step 312) and in that the commodity is thrown into the temporary accommodating vessel 218 (step 350) in place of that it is thrown onto the return belt 217 in the previous embodiment shown in FIGS. 16 and 17.

The operation of this embodiment will be described below with respect to points different from those of the previous embodiment. A commodity which was bypassed from the conveyor belt 212 to the re-reading unit 204 by the sorting plate 221 but its barcode could not be read even by re-reading operation, a plurality of commodities being conveyed which could not correspond to barcodes, and a commodity having a height different from the height of read commodity data are thrown into the temporary accommodating vessel 218 (step 350) by rotating the sorting plate 222 in the direction of the arrow e in the drawing.

In this embodiment, commodities are sorted into the commodity accommodating vessel 214, fragile article accommodating vessel 216 or temporary accommodating vessel 218 likewise the case shown in FIGS. 19A and 19B. Then, when the customer indicates the completion of the throwing operation (steps 312 and 313), it is checked whether any commodities are present in the temporary accommodating vessel 218 whose commodity data could not be read and thus whose prices were not added (step 351). When such commodities are present therein, the temporary accommodating vessel 218 is rotated in the direction of an arrow h in the drawing to move the commodities in the temporary accommodating vessel 218 onto the conveyor belt 212 (step 352). Thereafter, the conveyor belt 212 is reversed (step 353) to convey the commodities in the direction of an arrow i in the drawing and return them to the throwing port 211. It is determined whether all the commodities present in the temporary accommodating vessel 218 have been returned to the throwing port 211 by detecting commodities being conveyed at the vicinity of the throwing port 211 (step 354) and the conveyor belt 212 is reversed until all the commodities have been returned. Thereafter, the same processes as those shown in FIGS. 19A and 19B are carried out, so that the customer or store clerk inputs commodity data and commodities whose data have been input are thrown again (step 302) to accumulate them in the commodity accommodating vessel 214 and fragile article accommodating vessel 216. When commodities are removed from the temporary accommodating vessel 218 as described above, the process goes to a clearing-off process (step 314).

Figure 29:
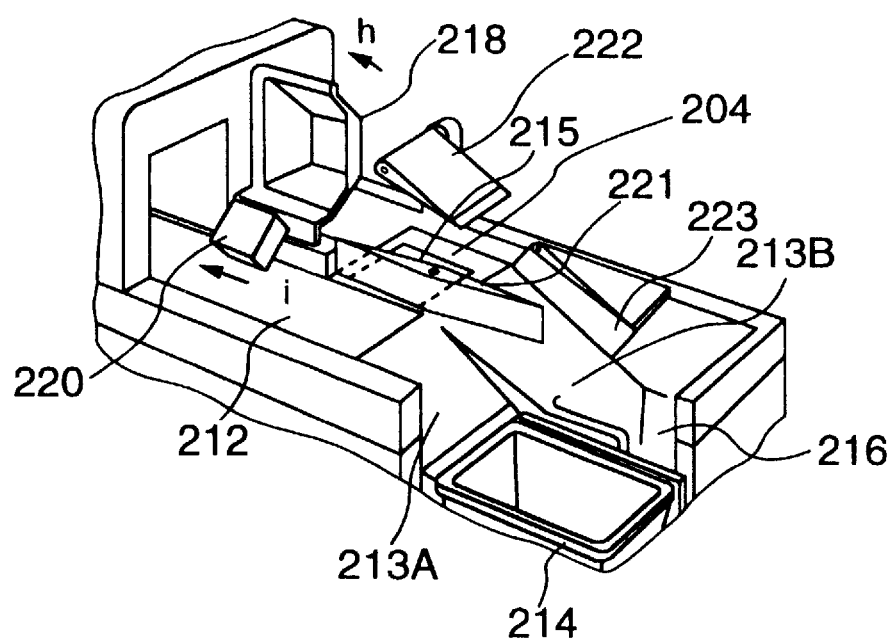
FIG. 29 is a view explanatory of commodity returning operation in the embodiment of FIG. 20.

FIG. 29 shows the operation for moving the commodity 220 from the temporary accommodating vessel 218 onto the belt 212 at step 352 of the above operation. The temporary accommodating vessel 218 is rotated in the direction of the arrow h in the drawing from the state shown in FIG. 20 to thereby move the commodity 220 onto the belt 212 moving in the reverse direction (in the direction i). The sorting operations effected by the other sorting plates 221 to 223 are the same as those of the previous embodiment shown in FIGS. 16 and 17.

According to the embodiment shown in FIGS. 20 and 21, if commodities remain in the temporary accommodating vessel 218 when the customer indicates the completion of throwing operation, the commodities are returned to the throwing port by moving the belt in the reverse direction, so that the customer can process the reading unable commodities. Thus, the number of store clerks per unit of the apparatus to support the customer can be reduced and thus personnel expenses can be saved.

Further, this embodiment has an advantage that it does not need a different conveying means for returning commodities to the throwing port 211 which is used by the previous embodiment shown in FIGS. 16 and 17 and thus the arrangement of the apparatus can be simplified. Further, since the commodities are returned to the throwing port after all the commodities are thrown once, operation is not complicated.

As a method other than the method utilizing the barcode, this system may mount a miniature transmitter/ receiver on a commodity and the data of the commodity may be read on a wireless basis.

According to the present invention, a commodity clearing-off speed can be increased and thus a waiting time for clearing-off commodities can be reduced in masssales stores, convenience stores and the like. The number of store clerks per unit of the apparatus can be reduced and thus personnel expenses can be saved by that reading operation is automatically effected and reading unable commodities are processed by the customer.

What is claimed is:
1. An automatic barcode recognizing apparatus including conveying means having a conveying passage on which an article to which a barcode is attached is conveyed and barcode reading means for recognizing the barcode of the article being conveyed by being placed on the conveying passage, comprising:

article detecting means for detecting that said article is placed on said conveying passage;

height detecting means for detecting the height of said article on said conveying passage;

conveying state detecting means for detecting the position of said article on said conveying passage in the width direction of said conveying passage;

arithmetic operation means for calculating the upper surface center of said article, the distance from said barcode reading means to the upper surface center of said article, the side surface centers of said article and the distances from said barcode reading means to the side surface centers of said article, based on the result of detection of said height detecting means and said conveying state detecting means; and focal position adjusting means for focusing the focal position of said barcode reading means on the upper surface center of said article and the side surface centers of said article, based on the result of calculation of said arithmetic operation means.

2. An automatic barcode recognizing apparatus according to claim 1, wherein said height detecting means has a light emitting unit for emitting planar lights, the beam of said planar lights being parallel with the surface of said conveying passage and the planes of said lights being perpendicular to the surface of said conveying passage and transitting said conveying passage, and a light receiving unit for receiving said planar lights.

3. An automatic barcode recognizing apparatus according to claim 1, wherein said height detecting means has a light emitting unit for emitting planar lights, the beam of said planar lights being parallel with the surface of said conveying passage and the planes of said lights being perpendicular to the surface of said conveying passage and transitting said conveying passage, a reflecting mirror for reflecting said planar lights having transited said conveying passage and a light receiving unit for receiving lights reflected by said reflecting mirror.

4. An automatic barcode recognizing apparatus according to claim 1, wherein said conveying state detecting means is any one of a one-dimensional image sensor and a two-dimensional image sensor disposed at a position overlooking said conveying passage.

5. An automatic barcode recognizing apparatus according to claim 1, wherein said focal position adjusting means has a mirror surface for reflecting a laser beam for detecting a barcode as well as changing the light path direction of said laser beam and focuses the scanning center of said barcode reading means on the upper surface center of said article and the side surface centers of said article by changing the angle of said mirror surface.

6. An automatic barcode recognizing apparatus according to claim 1, wherein said focal position adjusting means provides a plurality of lenses each having a different focal distance with a laser beam emitting unit for detecting a barcode and adjusting a focal distance by switching said lenses based on the result of detection of said height detecting means and said conveying state detecting means.

7. A commodity recognizing apparatus for conveying commodities thrown on a conveying passage by a customer and recognizing said commodities by reading the barcodes of said commodities by barcode reading means while said commodities are being conveyed, comprising:

one-dimensional or two-dimensional pattern reading means disposed upstream of said barcode reading means on said conveying passage for reading the patterns of said commodities being conveyed;

trigger signal creating means for creating a trigger signal for starting reading operation effected by said pattern reading means;

height measuring means for measuring the heights of said commodities;

arithmetic operation means for calculating the region where said commodities are present in the reading area of said barcode reading means based on the patterns of said commodities read by said pattern reading means and the heights of said commodities measured by said height measuring means;

reading area limiting means for limiting the reading area of said barcode reading means in accordance with the region calculated by said arithmetic operation means where said commodities are present;

memory means for storing whether said barcode reading means succeeds in the reading of a barcode or not for each region limited by said reading area limiting means; and register means for registering only the commodities having successfully read barcodes and stored in said memory means.

8. A recognizing method of a commodity recognizing apparatus including:

a conveying passage on which commodities thrown by a customer are conveyed;

barcode reading means for reading the barcodes of said commodities while said commodities are being conveyed;

one-dimensional or two-dimensional pattern reading means disposed upstream of said barcode reading means on said conveying passage for reading the barcode of said commodities being conveyed;

trigger signal creating means for creating a trigger signal for starting reading operation effected by said pattern reading means;

height measuring means for measuring the heights of said commodities;

arithmetic operation means for calculating the region where said commodities are present in the reading area of said barcode reading means based on the patterns of said commodities read by said pattern reading means and the heights of said commodities measured by said height measuring means;

reading area limiting means for limiting the reading area of said barcode reading means in accordance with the region calculated by said arithmetic operation means where said commodities are present;

memory means for storing whether said barcode reading means succeeds in the reading of a barcode or not for each region limited by said reading area limiting means; and register means for registering only the commodities having successfully read barcodes and stored in said memory means, wherein:

when said commodities thrown by said customer are conveyed on said conveying passage and said trigger signal creating means outputs a trigger signal by detecting said commodities, said pattern reading means reads the patterns of said commodities on said conveying passage, said height measuring means measures the heights of said commodities, said arithmetic operation means calculates the region where said commodities are present in the reading area of said barcode reading means based on the read patterns of said commodities and the measured heights thereof, said reading area limiting means sequentially limits the reading area of said barcode reading means in accordance with the region where said commodities are present, said memory means stores the result of said barcodes read by said barcode reading means for respective regions and said register means registers only the commodities which are present in the regions stored in said memory means where said barcodes are successfully read, whereby a plurality of commodities present in the reading area of said barcode reading means at the same time can be recognized.

9. An automatic commodity clearing-off method comprising the steps of conveying commodities thrown from a throwing port by conveying means, respectively, reading the barcodes attached to the commodities by barcode reading means, accommodating said commodities from which said barcodes have been read in a commodity accommodating vessel, adding the prices contained in the commodity data of the barcodes read from said commodities by arithmetic operation means and displaying and clearing off a total amount of money when a customer has completed the throwing of commodities and the prices of said commodities have been added, wherein when the barcode of a commodity cannot be read by said barcode reading means, the barcode of said commodity is read again by re-reading means provided independently of said barcode reading means and when said barcode can be read by said re-reading means, said commodity is accommodated in said commodity accommodating vessel and the price of said commodity is added, whereas when the barcode of the said commodity cannot be read even by said re-reading means, said commodity is moved to a temporary accommodating vessel, and wherein said conveying means is a conveying belt, said barcode reading means reads a barcode when said barcode is attached to the surface of a commodity conveyed on said conveyor belt which does not confront said conveyor belt and said re-reading means reads said barcode when said barcode is attached to the surface of said commodity which confronts said conveyor belt.

10. An automatic commodity clearing-off method comprising the steps of conveying commodities thrown from a throwing Port by conveying means, respectively, reading the barcodes attached to the commodities by barcode reading means, accommodating said commodities from which said barcodes have been read in a commodity accommodating vessel, adding the prices contained in the commodity data of the barcodes read from said commodities by arithmetic operation means and displaying and clearing off a total amount of money when a customer has completed the throwing of commodities and the prices of said commodities have been added, wherein when the barcode of a commodity cannot be read by said barcode reading means, the barcode of said commodity is read again by re-reading means provided independently of said barcode reading means and when said barcode can be read by said re-reading means, said commodity is accommodated in said commodity accommodating vessel and the price of said commodity is added, whereas when the barcode of the said commodity cannot be read even by said re-reading means, said commodity is moved to a temporary accommodating vessel, and wherein height data indicating the height of said commodity is entered into said commodity data, the height of said commodity is measured when said barcode is read by said barcode reading means, and when the difference between the measured height and the height data contained in said read commodity data exceeds a predetermined value, said commodity is moved into said temporary accommodating vessel.

11. An automatic commodity clearing-off method comprising the steps of conveying commodities thrown from a throwing port by conveying means, respectively, reading the barcodes attached to the commodities by barcode reading means, accommodating said commodities from which said barcodes have been read in a commodity accommodating vessel, adding the prices contained in the commodity data of the barcodes read from said commodities by arithmetic operation means and displaying and clearing off a total amount of money when a customer has completed the throwing of commodities and the prices of said commodities have been added, wherein when the barcode of a commodity cannot be read by said barcode reading means, the barcode of said commodity is read again by re-reading means provided independently of said barcode reading means and when said barcode can be read by said re-reading means, said commodity is accommodated in said commodity accommodating vessel and the price of said commodity is added, whereas when the barcode of the said commodity cannot be read even by said re-reading means, said commodity is moved to a temporary accommodating vessel, and wherein when said commodity is a fragile commodity, fragile article information indicating that said commodity is fragile is entered into said commodity data and when said fragile article information is contained in the commodity data of a barcode read by said barcode reading means or said re-reading means, said commodity is accommodated in a fragile article accommodating vessel prepared independently of said commodity accommodating vessel.

12. An automatic commodity clearing-off method according to any one of claim 9 to claim 11, wherein the barcode of said commodity moved into said temporary accommodating vessel is read by manual reading means prepared independently of said barcode reading means or said re-reading means.

13. An automatic commodity clearing-off method according to any one of claim 9 to claim 11, wherein the barcode data of said commodity moved into said temporary accommodating vessel is manually input through a keyboard.

14. An automatic commodity clearing-off method according to any one of claim 9 to claim 11, wherein when a commodity is left in at least one of said commodity accommodating vessel, said fragile article accommodating vessel and said temporary accommodating vessel, said left commodity is detected and notified to a customer.

15. An automatic commodity clearing-off apparatus including:

conveying means for conveying commodities thrown into a throwing port and barcode reading means for reading the barcodes of said commodities conveyed by said conveying means;

a commodity accommodating vessel for accommodating commodities from which barcodes have been read by said barcode reading means; and adding means for taking out price data of said commodities pointed by barcode data from the commodity data and adding said price data, comprising:

re-reading means for effecting re-reading when said barcode is not read by said barcode reading means a temporary accommodating vessel;

first moving means for moving said commodity to said re-reading means when said barcode is not read by said barcode reading means;

second moving means for moving said commodity into said commodity accommodating vessel when said barcode is read by said re-reading means;

third moving means for moving said commodity into said temporary accommodating vessel when said barcode is not read by said re-reading means; and control means for controlling the operation of said first moving means, said second moving means and said third moving means in accordance with the result of reading effected by said barcode reading means and said re-reading means.

16. An automatic commodity clearing-off apparatus according to claim 15, wherein said conveying means is a conveying belt and said re-reading means reads the surface of said commodity confronting said conveyor belt when said barcode reading means reads said barcode.

17. An automatic commodity clearing-off apparatus according to claim 16 or claim 16, wherein height data indicating the height of said commodity is entered into said commodity data and said apparatus comprises height measuring means for measuring the height of a commodity conveyed by said conveying means and second control means for controlling the operation of said first moving means and said third moving means to move said commodity into said temporary accommodating vessel when the difference between the height of said commodity measured by said height measuring means and the data indicating the height of said commodity in said commodity data read by said barcode reading means exceeds a predetermined value.

18. An automatic commodity clearing-off apparatus according to claim 17, wherein said temporary accommodating vessel is disposed in the vicinity of said commodity throwing port and said third moving means is composed of second conveying means for conveying a commodity into said temporary accommodating vessel and a rotatable sorting plate for moving a commodity from said re-reading means to said second conveying means.

19. An automatic commodity clearing-off apparatus according to claim 17, wherein said temporary accommodating vessel is disposed in the vicinity of said re-reading means and said third moving means is composed of a rotatable sorting plate for moving a commodity from said re-reading means to said temporary accommodating vessel.

20. An automatic commodity clearing-off apparatus according to any one of claim 16 to claim 16, wherein said temporary accommodating vessel is disposed in the vicinity of said commodity throwing port and said third moving means is composed of second conveying means for conveying a commodity into said temporary accommodating vessel and a rotatable sorting plate for moving a commodity from said re-reading means to said second conveying means.

21. An automatic commodity clearing-off apparatus according to any one of claim 15 to claim 16, wherein said temporary accommodating vessel is disposed in the vicinity of said re-reading means and said third moving means is composed of a rotatable sorting plate for moving a commodity from said re-reading means to said temporary accommodating vessel.

22. An automatic commodity clearing-off apparatus according to claim 15, wherein when said commodity is a fragile commodity, fragile article information is entered into said commodity data and said apparatus comprises fourth moving means for accommodating said commodity into said fragile article accommodating vessel when said fragile article information is contained in said commodity data pointed by the barcode read from said commodity by said barcode reading means or said re-reading means.

23. An automatic commodity clearing-off apparatus according to claim 15, wherein said first moving means for moving a commodity to said re-reading means includes interval detecting means for detecting the intervals in a moving direction between a plurality of commodities moved by said first moving means and a mechanism for increasing said intervals detected by said interval detecting means to a value greater than a predetermined value when said detected intervals are smaller than said predetermined value.

24. An automatic commodity clearing-off apparatus according to claim 15, wherein said commodity accommodating vessel is composed of a carrying-back bag.

25. An automatic commodity clearing-off apparatus according to claim 15, comprising at least one of manually-operated type reading means for reading the barcode of a commodity accommodated in said temporary accommodating vessel prepared independently of said barcode reading means and said retreading means and input means for manually inputting said barcode.

* * * * *